United States Patent
Epstein et al.

(10) Patent No.: US 8,246,220 B2
(45) Date of Patent: *Aug. 21, 2012

(54) LED ARRAY SYSTEMS

(75) Inventors: Kenneth A. Epstein, Saint Paul, MN (US); Hung T. Tran, Woodbury, MN (US); John C. Schultz, Afton, MN (US); Robert M. Emmons, Saint Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/180,876

(22) Filed: Jul. 12, 2011

(65) Prior Publication Data

US 2011/0267799 A1    Nov. 3, 2011

Related U.S. Application Data

(63) Continuation of application No. 10/858,539, filed on Jun. 1, 2004, now Pat. No. 7,997,771.

(51) Int. Cl.
    *F21V 5/00*      (2006.01)
(52) U.S. Cl. .................. 362/339; 362/612; 362/625
(58) Field of Classification Search .............. 362/19, 362/231, 241, 246, 330, 339, 619, 625, 632; 385/31, 125, 901
See application file for complete search history.

(56) References Cited

U.S. PATENT DOCUMENTS

| | | |
|---|---|---|
| 4,274,217 A | 6/1981 | Ohshima |
| 4,679,044 A | 7/1987 | Knoll |
| 5,005,108 A | 4/1991 | Pristash |
| 5,678,335 A | 10/1997 | Gomi |
| 5,751,388 A | 5/1998 | Larson |
| 5,793,456 A | 8/1998 | Broer |
| 5,825,543 A | 10/1998 | Ouderkirk |
| 5,867,316 A | 2/1999 | Carlson et al. |
| 5,882,774 A | 3/1999 | Jonza |
| 5,995,690 A | 11/1999 | Kotz |
| 6,045,894 A | 4/2000 | Jonza |
| 6,096,247 A | 8/2000 | Ulsh |
| 6,122,103 A | 9/2000 | Perkins |
| 6,208,466 B1 | 3/2001 | Liu |
| 6,531,230 B1 | 3/2003 | Weber |
| 6,590,705 B1 | 7/2003 | Allen |
| 6,957,901 B2 | 10/2005 | Schach |
| 7,072,096 B2 | 7/2006 | Holman |
| 7,347,589 B2 | 3/2008 | Ge |
| 7,356,229 B2 | 4/2008 | Ouderkirk |
| 7,356,231 B2 | 4/2008 | Ouderkirk |

(Continued)

FOREIGN PATENT DOCUMENTS

| | | |
|---|---|---|
| EP | 0 426 411 | 5/1991 |
| JP | 10-082915 | 3/1998 |
| WO | 95-17303 | 6/1995 |

(Continued)

*Primary Examiner* — John A Ward
(74) *Attorney, Agent, or Firm* — Colene H. Blank

(57) ABSTRACT

A light emitting diode (LED) array comprises an array of LEDs mounted to a substrate. The LEDs emit light in a direction generally perpendicular to the substrate. An optical sheet is disposed over the LEDs. At least a portion of light entering one side of the optical sheet from the LEDs is guided within the optical sheet in a direction generally parallel to the substrate. Light extraction features direct light from the optical sheet in a generally forward direction. Such an array is useful for several applications, including space lighting, direct information display and backlighting of liquid crystal displays. The light spreading effect of the optical sheet reduces the amount of black space between LED pixels.

18 Claims, 19 Drawing Sheets

U.S. PATENT DOCUMENTS

| | | |
|---|---|---|
| 7,997,771 B2 * | 8/2011 | Epstein et al. .............. 362/339 |
| 2002/0159019 A1 | 10/2002 | Pokorny |
| 2003/0123247 A1 | 7/2003 | Parker |
| 2004/0056989 A1 | 3/2004 | Betz |
| 2005/0134527 A1 | 6/2005 | Ouderkirk |
| 2005/0265029 A1 | 12/2005 | Epstein |
| 2005/0276066 A1 | 12/2005 | Kim |
| 2006/0193578 A1 | 8/2006 | Ouderkirk |

FOREIGN PATENT DOCUMENTS

| | | |
|---|---|---|
| WO | 03-077013 | 9/2003 |
| WO | 2004-008233 | 1/2004 |
| WO | 2004-068182 | 8/2004 |

* cited by examiner

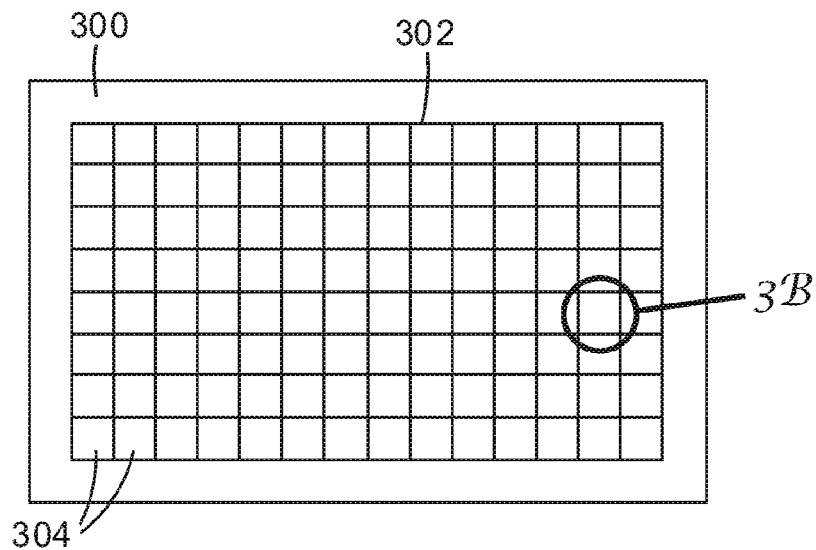
FIG. 3A
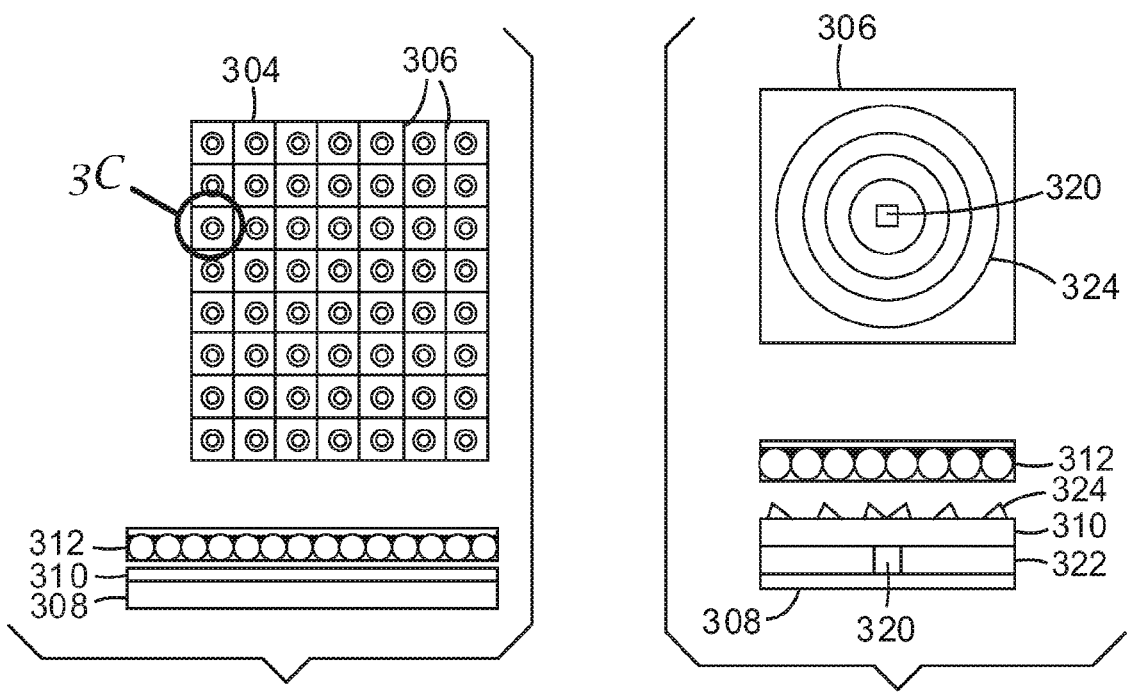
FIG. 3B
FIG. 3C

LED ARRAY SYSTEMS

CROSS REFERENCE TO RELATED APPLICATIONS

This application is a continuation of U.S. Ser. No. 10/858,539, filed Jun. 1, 2004 now U.S. Pat. No. 7,997,771, now allowed, the disclosure of which is incorporated by reference in its entirety herein.

FIELD OF THE INVENTION

The invention relates to lighting or display assemblies, and more particularly relates to lighting or display assemblies that use arrays of light emitting diodes (LEDS).

BACKGROUND

LED arrays are typically formed using LEDs that have a polymer encapsulant formed over an LED die and an associated reflector cup. The LED die itself has a quasi-Lambertian emission pattern and much of the light generated within the LED die is trapped due to total internal reflection at the die surface or emitted from the edge. The polymer encapsulant is shaped to extract more light and to focus the extracted light into a preferred emission profile. The reflector cup captures edge-emitted light and bends it forwards. The array, commonly formed as a tile, may also have side reflectors. The total effect of the reflectors and the encapsulant controls the optical profile of the LED pixel in the array.

Traditionally, the manufacture of a LED array thus includes steps for encapsulating the LED die within an encapsulated package, and then locating and placing the encapsulated package within the array. The optics of the array derive from the package and additional features formed on the array tile. A display, or illumination system, so constructed, consists of point sources of light that knit together visually from a long observation distance. However, the point sources of light break apart visually at shorter distances. Manufacturing is inherently inefficient due to the separate packaging and array population steps and the optics suffer due to the nature of the point source within an extended array. Furthermore, the resulting array tile is relatively thick and bulky.

SUMMARY OF THE INVENTION

The invention described herein is particularly useful for the manufacture and use of LED arrays that are used for lighting purposes or for information display.

According to one embodiment of the invention, an optical assembly for emitting light comprises an array of light emitting diodes (LEDs) mounted to a substrate. The LEDs emit light in a direction generally perpendicular to the substrate. An optical sheet is disposed over the LEDs. At least a portion of light entering one side of the optical sheet from the LEDs is guided within the optical sheet in a direction generally parallel to the substrate.

Another embodiment of the invention is directed to a light emitting system having a plurality of individually illuminated light emitting elements. The system comprises an array of light emitting diodes (LEDs), different LEDs corresponding to respective light emitting elements of the light emitting system. A light spreader sheet is disposed over the LEDs. Light entering the light spreader sheet from the LEDs is spread transversely within the spreader sheet over an area corresponding to the respective light emitting elements of the light emitting system. The light spreader sheet comprises light directing features that direct the spread light out of the spreader sheet.

Another embodiment of the invention is directed to a light emitting system having a plurality of individually illuminated light emitting elements. The system comprises an array of LEDs emitting light generally in a light emission direction, light spreading means for laterally spreading light in a direction across the array of the LEDs, and light directing means for directing light from the light spreading means in a desired illumination direction.

Another embodiment of the invention is directed to an assembly for emitting light. The assembly comprises an array of LEDs arranged on a substrate to emit light generally in a light emission direction. An array of reflectors is disposed with the LEDs. The reflectors define individual portions of a reflector sheet. The reflectors have respective apertures and respective LED of the array of LEDs protrude through the respective apertures. The substrate is positioned to a first side of the reflector sheet, and light emitting surfaces of the LEDs are being positioned to a second, reflecting side of the reflector sheet. A screen layer is disposed on the second side of the reflector sheet, at least some of the light from the LEDs being directed by the screen layer after reflecting off the reflectors.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which:

FIGS. 3A-3C show details of an illuminated panel according to an embodiment of the present invention in increasing detail;

Figure 1:
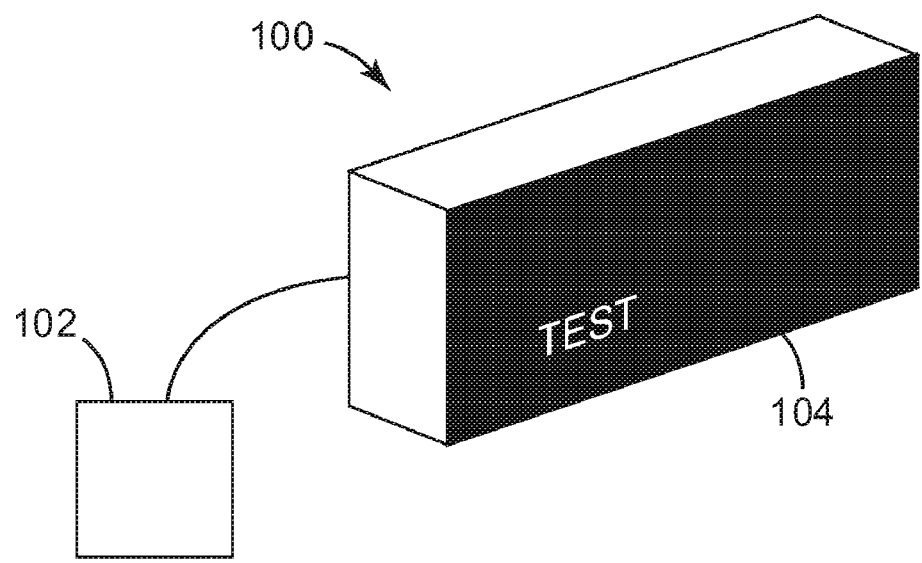
FIG. 1 schematically illustrates a lighting unit according to an embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is applicable to lighting units, and is more particularly applicable to lighting units that provide illumination using light emitting diodes (LEDs). The lighting units may provide light for illuminating an area or may provide information to a viewer by selective illumination of different areas of the lighting unit, as in an information display.

An example of an addressable lighting unit 100 that uses LEDs is schematically illustrated in FIG. 1. A power supply 102 supplies electrical power to the display panel 104. The display panel 104 comprises an array of individually addressable light emitting elements. The power supply 102, or control circuits within the panel 104, selectively provides current to individual light emitting elements so as to illuminate a desired pattern on the display panel 104.

Figure 2:
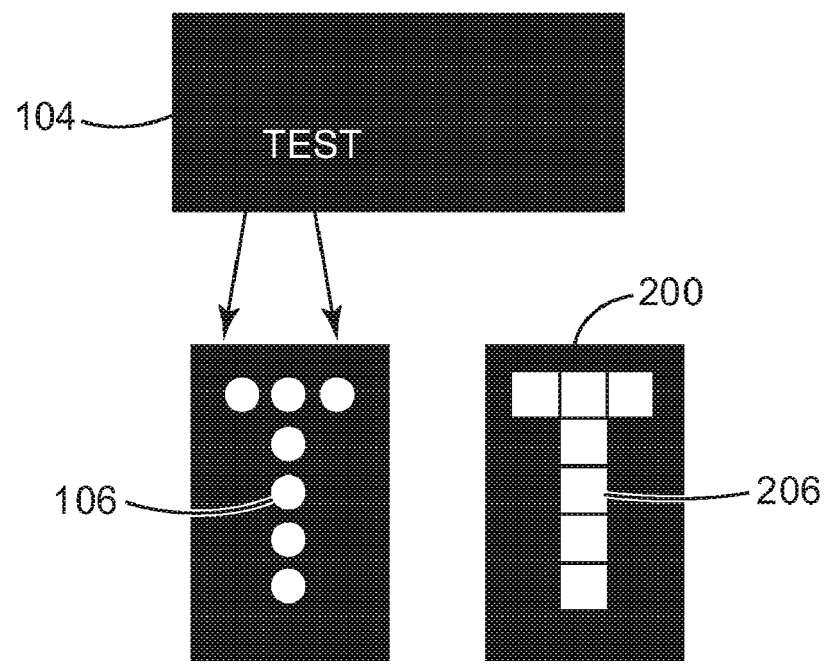
FIG. 2 schematically illustrates an illuminated panel of the lighting unit of FIG. 1.

Part of the display panel 104 is shown in FIG. 2. As the viewer moves closer to the display panel 104, the individuality of the light emitting elements 106 becomes more apparent. If the viewer moves sufficiently close to the panel 104, it becomes easier for the viewer to perceive the individual light emitting elements of the display panel, and more difficult to perceive the message being displayed on the panel. For example, the individual elements 106 form a "T" shape, but the "T" is not as easily discerned as the view of the "T" from further away.

Part of the reason for this problem is that the individual light emitting elements 106 on the display are separated from each other by a significant black border and so, at close distances, it becomes easier for the viewer to see the light emitting elements as separate elements, rather than part of a pattern. For comparison, the display of the letter "T" in the panel 200 demonstrates the enhancement in the readability of information where the extent of the dark space separating adjacent light emitting elements 206 is reduced.

In another embodiment, the lighting unit 100 may simply illuminate all the lighting emitting elements so as to provide as much light as possible. Such a lighting unit may be used for lighting purposes, rather than for information display.

An embodiment of the structure of the lighting unit 300 is further explained with reference to FIGS. 3A-3B. The display panel 302 of the lighting unit 300 comprises a number of tiles 304, and each tile 304 comprises a number of light emitting elements 306. The layers of the tile 306 comprise a substrate 308, a guiding layer 310 and an optional contrast/projection filter 312.

The contrast/projection filter 312 is used to i) reduce the amount of reflected ambient light and/or ii) provide viewing angle so as to operate as a projection screen. The selection of ambient light reduction and viewing angle depends on the particular application of the lighting unit, whether there is significant ambient light that needs to be rejected or whether it is desirable to spread the light from the lighting unit over a wide angle. For example, where the lighting unit is used in outdoor information display applications, it may be desirable to include both ambient light reduction, in order to improve the contrast under direct sunlight, while also providing a wide viewing angle so as to increase the area in which a viewer can see the information. In another example, where the lighting unit is used indoors, there may be no need to include ambient light rejection.

Where the contrast/projection filter 312 reduces the reflection of ambient light, the contrast/projection filter may include anti-reflection properties, for example an anti-reflection layer, to reduce the amount of reflection of the ambient light. The filter 312 may also, or alternatively, include anti-glare properties that reduce the specular reflection of the ambient light, for example a matte surface. Another approach to reducing the amount of reflected ambient light is to absorb the ambient light. Where the filter 312 provides viewing angle, the filter may include one or more layers that operate as a projection screen, for example a lenticular projection screen, or a beaded screen. Some lenticular and beaded screens provide both ambient light reduction and viewing angle. One example of such a screen, illustrated in FIGS. 3B and 3C, is a Vikuiti™ XRVS type screen available from 3M Company, St. Paul, Minn. The XRVS screen provides viewing angle by refracting the light through transparent spheres embedded in a layer of absorbing material: the transparent spheres provide a low loss path for the light to pass through the screen while the absorbing material absorbs the incident ambient light. Other types of filters may be included in the contrast/projection filter, for example a polarizer layer, such as a reflective polarizer or an absorbing polarizer, that transmits light in a desired polarization state. Other types of filter that may be incorporated include a Vikuiti™ Circular Polarizer (CP) layer, or a Vikuiti™ Light Control Film layer that provides privacy from off-axis viewing and/or provides reduction in the amount of ambient light that is reflected from the display. Both Vikuiti™ layers are available from 3M Company.

At the level of an individual light emitting element 306, one or more LEDs 320 are disposed on the substrate 308. If only a single color needs to be emitted from the light emitting element 306, then only a single LED may be used, or more than one LED of the same type may be used to augment the optical power emitted by the light emitting element 306. Different LEDs may be used to produce the different colors where the color of light emitted from the light emitting element is selectable. Individual control of the different LEDs leads to the ability to control the color of the emitted light. In addition, if it is desired that the light emitting element 306 emit white light, then the light emitting element 306 may be provided with a number of LEDs emitting light of different colors, whose combined effect is to emit light perceived by a viewer to be white. Another approach to producing white light is to use one or more LEDs 320 that emit light at a relatively short wavelength and to convert the emitted light to white light using a phosphor wavelength converter. White light is light that stimulates the red, green, and blue sensors in the human eye to yield an appearance that an ordinary observer would consider "white". Such white light may be biased to the red (commonly referred to as warm white light) or to the blue (commonly referred to as cool white light). Such light can have a color rendering index of up to 100.

The term LED is used to refer to different forms of inorganic semiconductor light emitting diode formed, for example, from a combination of one or more Group III elements and of one or more Group V elements (III-V semiconductor). Examples of III-V semiconductor materials that might be used in an LED include nitrides, such as gallium nitride or indium gallium nitride, and phosphides, such as indium gallium phosphide. Other types of III-V materials may also be used, as might inorganic materials from other groups of the periodic table.

The LEDs may be packaged LEDs or non-packaged LEDs, for example, LED dies, surface-mounted LEDs, chip-on-board LEDs and LEDs of other configurations. The term LED also includes LEDs packaged or associated with a phosphor where the phosphor is used to convert light emitted from the LED to light at a different wavelength. Chip-on-board (COB) is a hybrid technology that employs face-up-bonded chip devices interconnected to a substrate conventionally, for example using wire bonding. Connections may be made by wire bonding, tape automated bonding (TAB), or flip-chip bonding. The examples illustrated herein mostly show LED dies, but this is not intended as a limitation, and other types of packaged LED, as described in this paragraph, may also be used.

A reflective layer, 322 may be provided on the substrate 308 to direct light emitted from the LED 320 towards the viewer. Also, the guiding layer 310 may include a number of light extraction features 324 for extracting light from the film and directing the light towards the viewer, through the optional screen layer 312. The light extraction features 324 may be arranged in a radial pattern on the guiding layer 310, centered on or about the LED 320. The optical path followed by light emitted from the LED 320 may include reflection within the guiding layer 310 before being directed to the viewer. The tile structure may be eliminated if the manufacturing processes permit the manufacture of sufficiently large substrate, lens films and screen layers.

Figure 4A:
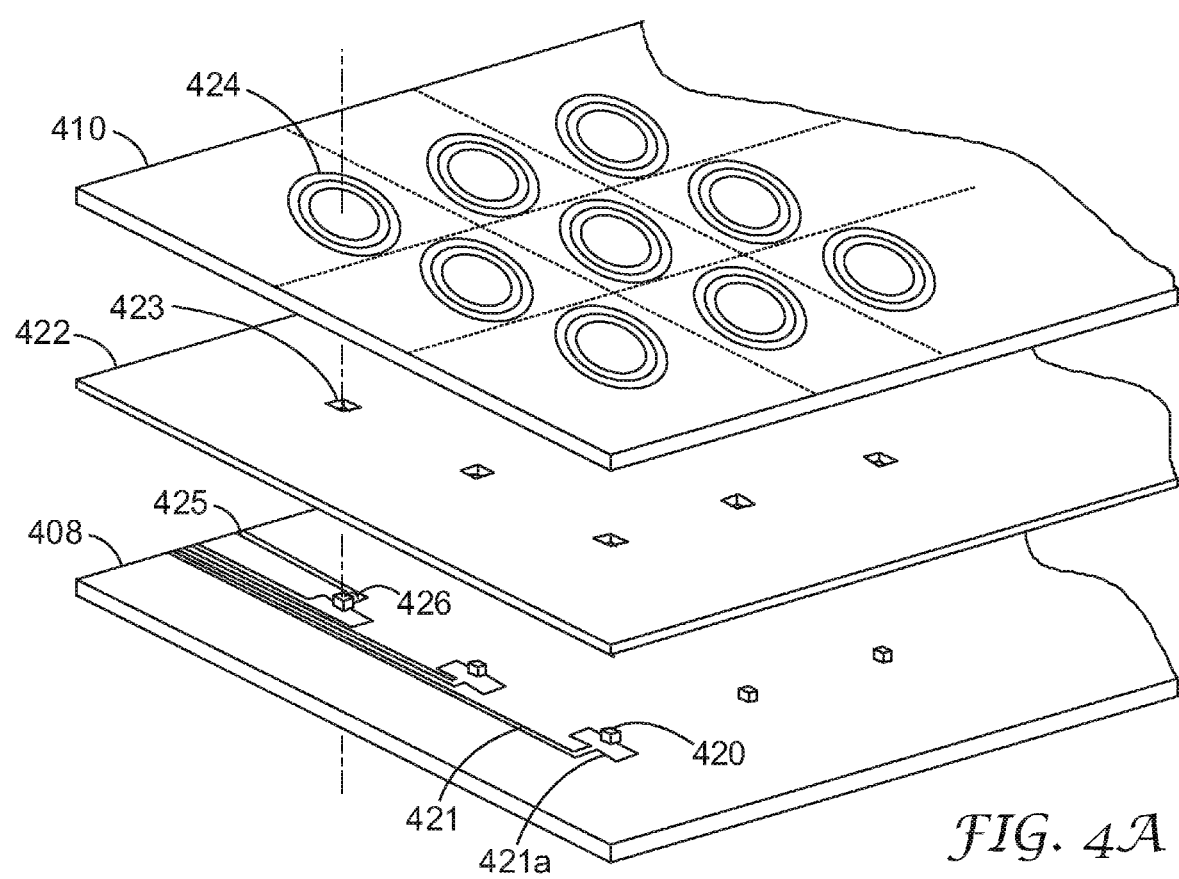
FIG. 4A schematically illustrates an exploded view of an embodiment of a lighting panel according to principles of the present invention.

A partial exploded view of a lighting unit 400 is schematically presented in FIG. 4A. The lighting unit 400 comprises a substrate 408 on which are arrayed a number of LEDs 420. The substrate 408 may be formed from any suitable type of material. For example, the substrate 408 may be formed from a metal, a ceramic or a polymer. One particular example of a polymer substrate is polyimide, such as Kapton-brand polyimide manufactured by Du Pont, Wilmington, Del. The substrate 408 may be flexible or may be rigid. The substrate 408 may also be formed from a transparent material, such as polycarbonate, for example as manufactured by GE Plastics, Pittsfield, Mass.

An intermediate layer 422 may be introduced between the substrate 408 and the guiding layer 410. The guiding layer 410 is typically transparent to the light emitted by the LED 420 and may be formed, for example, from a transparent polymer, such as a polycarbonate, a polyester, a urethane, an acrylate or the like. This list of polymer materials is not intended to be an exhaustive list of suitable polymer materials.

The guiding layer 410 may include an array of light extraction elements 424 associated with each LED 420. The intermediate layer 422 includes apertures 423, also referred to as vias, that are registered to the LEDs 420 disposed on the substrate 408. The intermediate layer 422 may be reflective for light at the wavelength emitted by the LED 420. The intermediate layer 422 may comprise, for example, a multilayer polymer reflective film such as Vikuiti™ ESR film available from 3M Company, St. Paul, Minn. The intermediate layer 422 may also be a white diffuse reflector such as a matrix containing diffusely reflecting particles, for example titanium dioxide particles. It will be appreciated that the intermediate layer 422 may also include some other type of reflector, such as a metalized layer or multilayer dielectric coating. The intermediate layer 422 may be bonded to the substrate 408, for example using a pressure sensitive adhesive. Apertures may be formed in the intermediate layer 422 using, for example, laser milling.

In another embodiment, the intermediate layer 422 may be non-reflecting. This is particularly useful where the lighting unit is used in applications with high amounts of ambient light. The non-reflecting intermediate layer 422 may be formed from a polymer layer that includes an absorbing species, such as carbon particles, distributed within the polymer matrix. The non-reflecting intermediate layer helps to increase the viewability of the light emitted from the LEDs 420 by reducing the amount of ambient light reflected by the lighting unit.

Several different approaches are available for forming the guiding layer 410 over the LEDs 420. One example is to laminate the guiding layer 410 over the LEDs 420 and/or the intermediate layer 422 as a sheet with pre-prepared light extraction elements. In another example, the guiding layer 410 may be formed by coating a polymer layer over the LEDs 420 and/or the intermediate layer 422 and by forming the light extraction elements in situ. Presentation of these two examples is not intended to present an exhaustive list of approaches to forming the guiding layer 410 over the LEDs 420.

Conductors may be provided on different layers for carrying electrical current to and from the LEDs 420. For example, conductors may be provided on any of the substrate 408, the intermediate layer 422 and/or the guiding layer 410 to carry current to and from the LEDs 420. The conductors may take the form of metallic traces, for example formed from copper. In the example illustrated in FIG. 4A, conductors 421, are positioned on the substrate 408 to carry current to and/or from the LEDs 420. The LED 420 is wire bonded to a conductor 425 on the substrate 408 via a wire bond 426. The LED 420 may also be of the flip-chip variety, with both electrodes formed on its lower surface. Electrical connections may be made to electrical conductors using any suitable technique, such as solder reflow, or connection using a conductive epoxy such as Metech type 6144, available from Lord Corp., Cary, N.C.

Figure 4B:
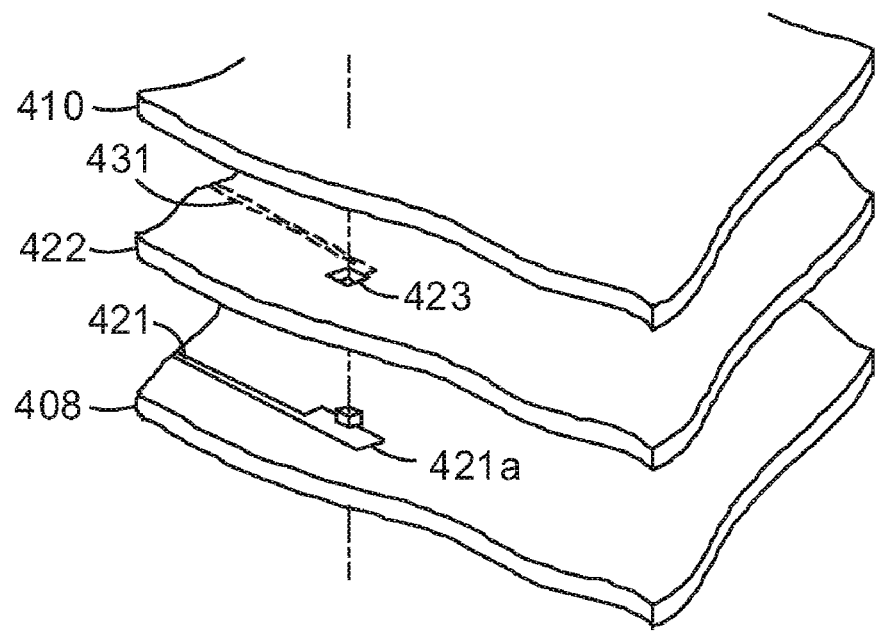
FIGS. 4B-4F schematically illustrate exploded views of other embodiments of lighting panels according to principles of the present invention.
Figure 4C:
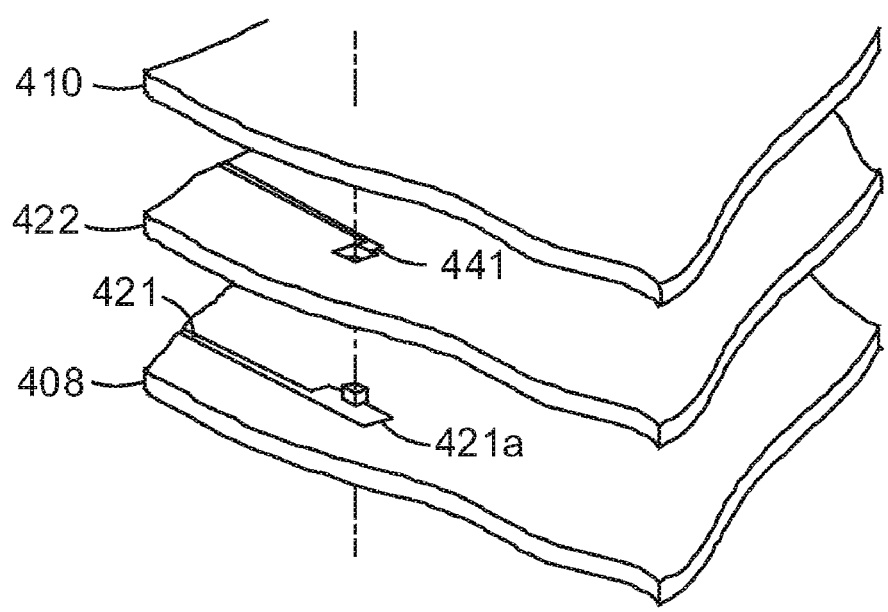
Figure 4D:
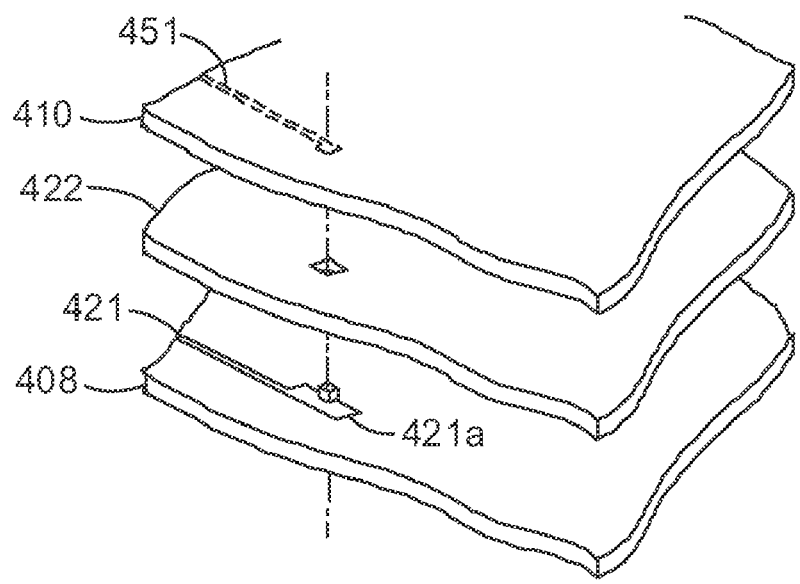

The LED 420 may be electrically connected to conductors provided on other layers, as is now discussed with regard to FIGS. 4B-4E. FIG. 4B schematically illustrates an example where conductors 421 are provided on the substrate 408 and other conductors 431 are positioned on the lower surface of the intermediate layer 422. FIG. 4C schematically illustrates an example where conductors 421 are provided on the substrate 408 and other conductors 441 are positioned on the upper surface of the intermediate layer 422. FIG. 4D schematically illustrates an example, where conductors 421 are provided on the substrate 408 and other conductors 451 are positioned on the lower surface of the guiding layer 410.

Figure 4E:
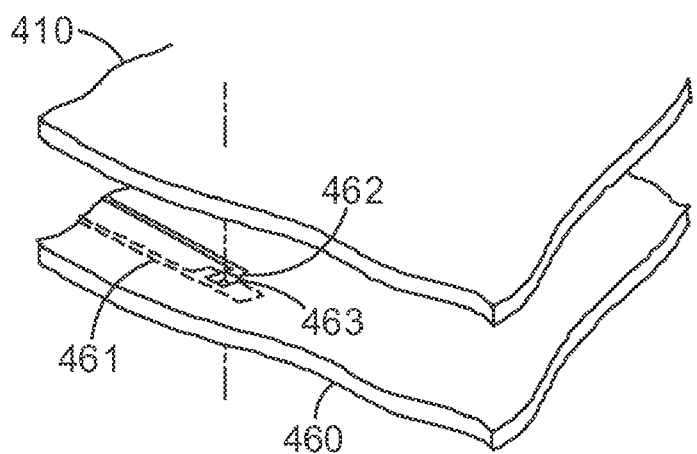

In another approach, schematically illustrated in FIG. 4E, the layer 460 may be provided with both conductors, 461 and 462, which may be provided on different sides of the layer 460 or on the same side of the layer 460. The layer 460 contains an aperture or recess 423 that accepts the LED (not shown). The layer 460 may be a substrate layer, for example, where the substrate is formed of a reflective material, or may be an intermediate layer, in which case a substrate layer (not shown) may be provided below the layer 460. The conductor 461 may cover the opening of the aperture 423, so as to make the aperture 423 a blind hole, which holds the LED in place in the aperture 423.

The substrate 408 may be provided with a metallic layer on its lower surface (not shown) for extracting heat generated by the LEDs 420. In addition, the conductors 421 may be provided with large area pads 421a to aid in spreading the heat generated by the LEDs 420. Generally, where the conductors 420 do not lie in the optical path between the LEDs 420 and the viewing space, the dimensions of the conductors 420 may be larger so as to aid in spreading the heat from the LEDs 420. Where the conductors are positioned in the optical path, however, for example on the lower surface of the guiding layer 410 or on the upper surface of a reflective intermediate layer 422, it is generally desirable to reduce the size of the conductors so as to reduce adverse effects on light passing to the viewing space.

The LEDs 420 may be arranged on the substrate 408 in a rectangular pattern, or square pattern, as illustrated. This leads to easy display of vertical and horizontal lines in an information display application. A rectangular or square pattern is not required, however, and the LEDs 420 may be laid out on the substrate 408 in some other pattern, for example in a hexagonal pattern. The actual shape of the light emitting element may be square, rectangular, round or some other shape. The interstices between light emitting elements, in other words those areas between light emitting elements where there is little or no light emitted, may be used as bonding surfaces, for example to fasten brightness enhancing films or projection filters.

Figure 4F:
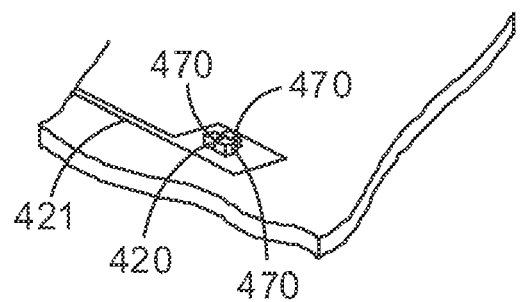

Although only one LED 420 is associated with each light emitting element in FIGS. 4A-4D, there may be more than one LED 420 associated with each light emitting element. For example, the LED 420 may comprise a plurality of LEDs, such as LED dies 470 mounted close together and emitting different colors, as schematically illustrated in FIG. 4F. Such an arrangement permits not only the production of a mixed light color, such as white light, it also permits the user to control the shade of the color emitted by controlling the relative amounts of light emitted from each LED.

In the examples described below, the LEDs are illustrated in the form of chips (dies) that are directly mounted to the substrate. This is not intended as a limitation of the invention and other forms of LED may also be used.

Figure 5A:
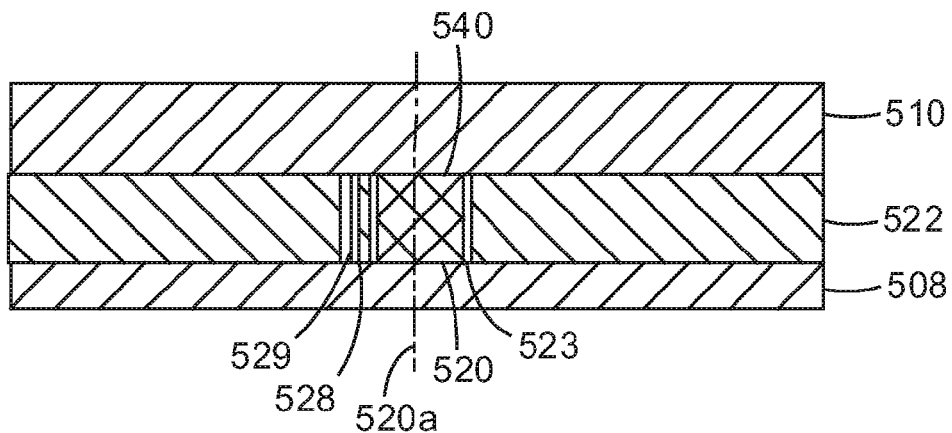
FIGS. 5A-5E show schematic cross-sections through different embodiments of light emitting elements of a lighting unit according to principles of the present invention.

A cross-section through one particular embodiment of a light emitting element 500 is schematically illustrated in FIG. 5A. In this embodiment, the LED 520 is bonded to the substrate 508. The intermediate layer 522 has a height approximately the same as the LED 520 and the guiding layer 510 may be bonded to both the LED 520 and the intermediate layer 522. Where there is a wire bond between the LED 520 and the substrate 508, the wire bond 529 may pass between the LED 520 and the substrate in a separate via 528 through the intermediate layer 522. The wire bond 529 may also pass within the same via 523 as the LED 520.

While the light from the LED is emitted over a wide range of angles, the LED 520 is positioned to direct light generally upwards, in a direction away from the substrate 508. An LED axis 520a is shown lying perpendicular to the substrate 508: many LEDs emit light symmetrically about the LED axis 520a. Where the light is not emitted symmetrically about the LED axis, 520a, the LED axis corresponds to the average direction along which light is emitted from the LED 520. The axis 520a need not represent the direction of maximum light intensity emitted by the LED 520.

Figure 5B:
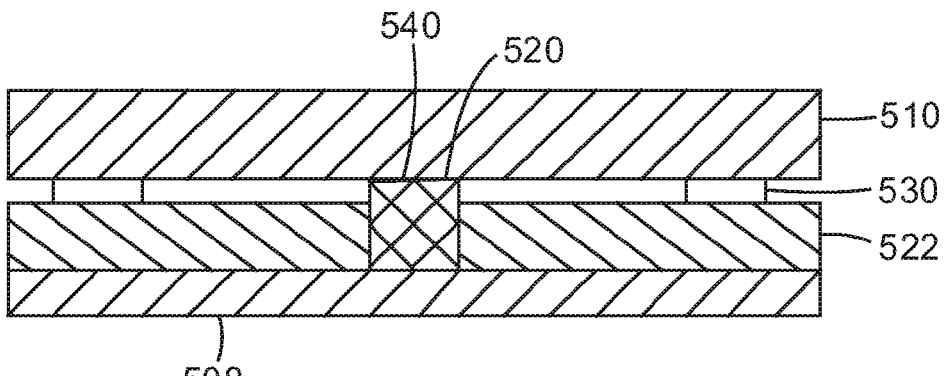

A cross-section through another embodiment is schematically illustrated in FIG. 5B. In this embodiment, the LED 520 is higher than the intermediate layer 522 and stand-offs 530 may be used to hold the guiding layer 510 above the intermediate layer 522. The stand-offs 530 may hold the guiding layer 510 at a height that contacts the LED 520 or may hold the guiding layer 510 at a height out of contact with the LED 520.

Figure 5C:
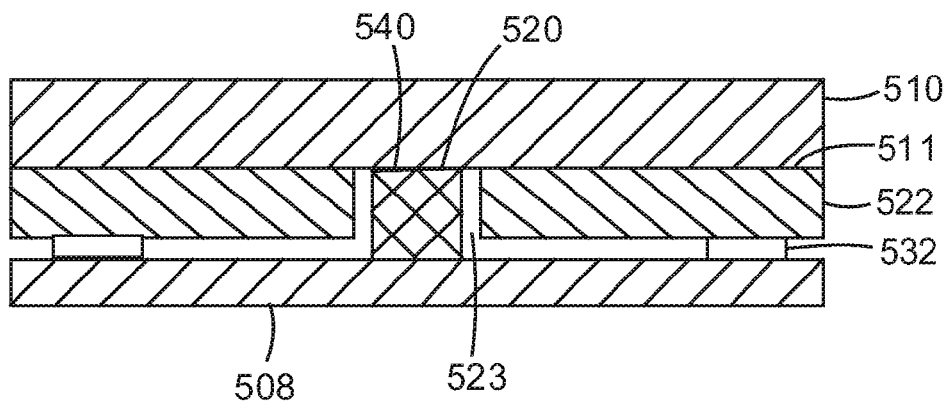

A cross-section through another embodiment is schematically illustrated in FIG. 5C. In this embodiment, the height of the intermediate layer 522 is less than the height of the LED 520. Stand-offs 532 are provided between the intermediate layer 522 and the substrate 508. The intermediate layer 522 may be bonded to the lower surface 511 of the guiding layer 510.

Figure 5D:
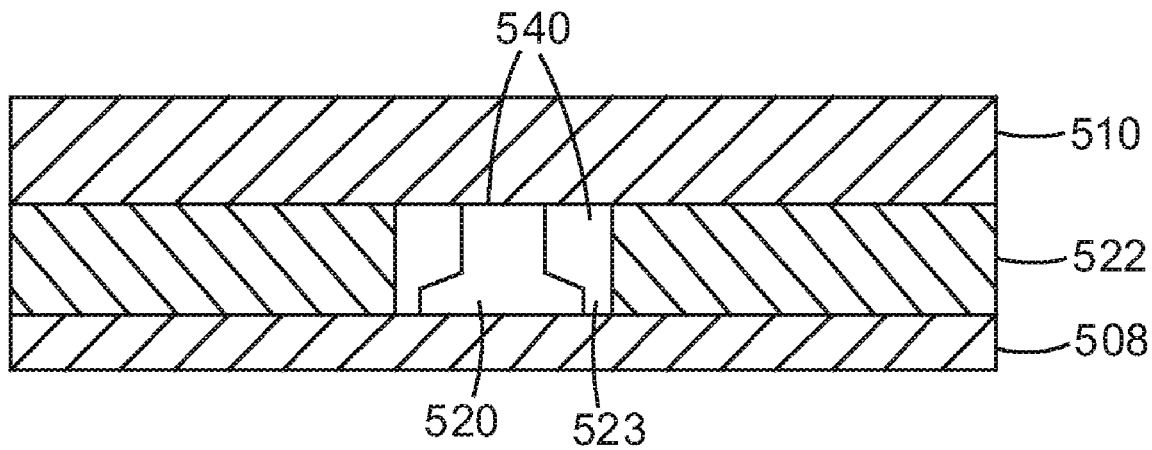

The LED need not be square or rectangular in cross-section. For example, the LED 520 may have a different shape, as is schematically illustrated in FIG. 5D. Furthermore, the aperture in the intermediate layer 522 may be sized larger than the LED 520 so as to reduce the constraints on registration between the LEDs 520 and the intermediate layer 522 when assembling the lighting unit.

Figure 5E:
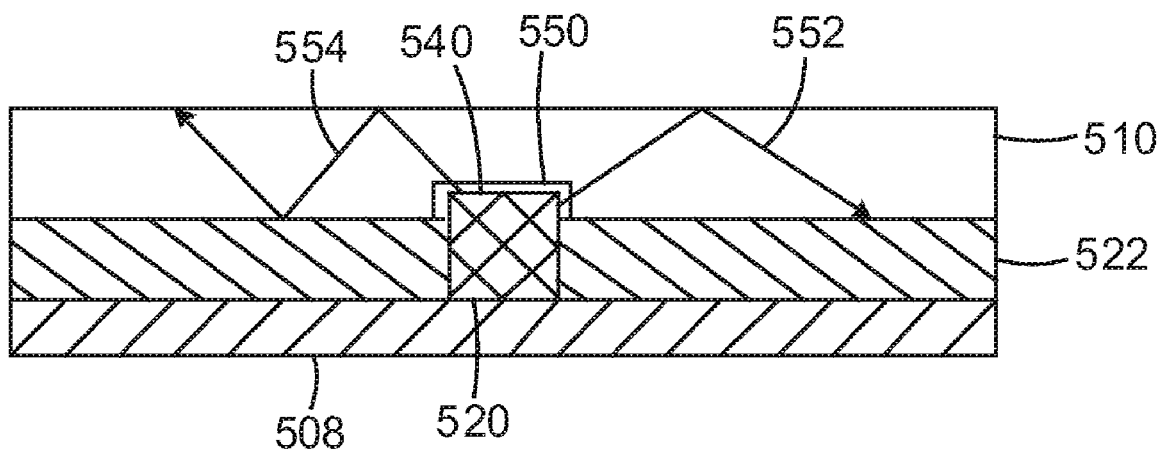

A cross-section through another embodiment is schematically illustrated in FIG. 5E, in which a portion of the LED 520 sits within a recess 550 in the guiding layer 510. In this embodiment some of the light 552 that is emitted from the side of the LED 520 is directed into the guiding layer 510 and is guided along the guiding layer 510. Light 554 that is emitted from the top of the LED 520 may also be guided along the guiding layer 510.

Optical coupling between the LED 520 and the guiding layer 510 may be facilitated through the use of an optical coupling material 540 disposed between the LED 520 and the guiding layer 510. The optical coupling material 540 may also provide adhesive properties that increase structural integrity.

The optical coupling material 540 may be applied in different ways during the assembly process. In one approach, the coupling material 540 is disposed on top of the LEDs 520 prior to application of the guiding layer 510. The guiding layer 510 is then applied over the assembly of LEDs 520. Such application typically displaces the coupling material 520 so as to spread into the vias 523 containing the LEDs 520 and also between the intermediate layer 522 and the guiding layer 510. In another approach, the guiding layer 510 is applied over the LEDs 520, and then the coupling material 540 is permitted to wick in between the guiding layer 510 and the intermediate layer 522 and LEDs 520 through capillary action. In this approach, the coupling material may also fill, or partially fill, the vias 523 containing the LEDs 520. One example of the optical coupling material 540 is Norland type NOA 81 optical adhesive, supplied by Norland Products, Cranbury, N.J.

Different approaches to distributing the light from the LED are now described with reference to FIGS. 6-18. In many of these approaches, some of the light from the LED is reflected within the guiding layer 510, at either the lower surface or the upper surface, or both, and so the guiding layer 510 may be said to guide the light from the LED. Laterally guiding the light away from the LED, also referred to as spreading the light, before directing the light to the viewer may help to reduce the amount of dark space between adjacent light emitting elements of the lighting unit. It will be appreciated that not all the light emitted by the LED 520 need be guided within the guiding layer 510.

Figure 6:
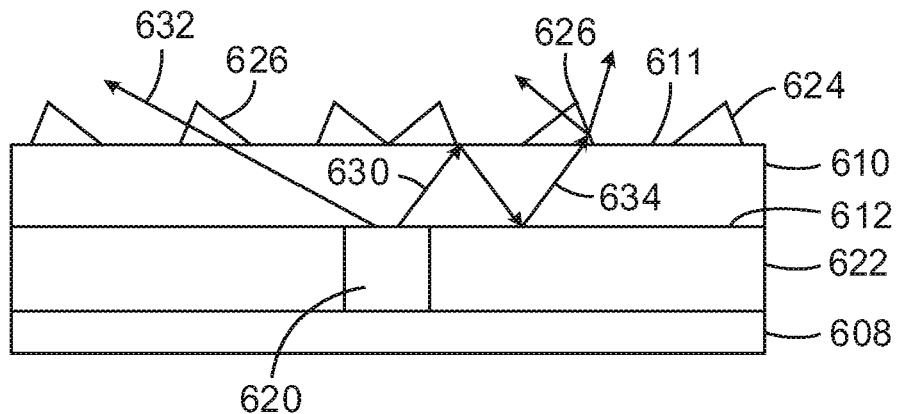
FIG. 6 schematically illustrates a cross-section through a light emitting element of a lighting unit, where an embodiment of a light extraction element includes prismatic elements on a guiding layer, according to principles of the present invention.

In FIG. 6, an LED 620 is disposed on a substrate 608 and is surrounded by an intermediate layer 622, which may be a reflecting film. A guiding layer 610 lies over the LED 620. Light from the LED 620 passes into the guiding layer 610. The side of the guiding layer 610 facing away from the LED is provided with a light extraction feature 624. In this particular embodiment, the light extraction feature 624 includes prismatic structures 626 disposed about the LED 620. The prismatic structures 626 may be formed as a Fresnel lens with the LED 620 at its center. Light 630 from the LED 620 passes into the guiding layer 610. Some of the light 632 may be emitted directly via the prismatic structure 626. Other portions of the light 634 may be reflected within the guiding layer 610, for example by reflection off the upper surface 611 of the guiding layer 610. The light 634 may also reflect off the lower surface 612 of the guiding layer 610 or off the intermediate layer 622. The light 634 is directed in a forwards direction towards the viewer by the prismatic structures 626.

In this and the following embodiments, the light may be reflected back into the guiding layer 610 by the intermediate layer 622, or may be internally reflected and/or refracted at the lower surface 612 of the guiding layer 610. Where the light is internally reflected at the lower surface 612, light extraction features may also be provided on the lower surface 612. Where the light is reflected by the intermediate layer 622, then light extraction features may also be provided on the intermediate layer 622 and/or on the lower surface 612.

Figure 7:
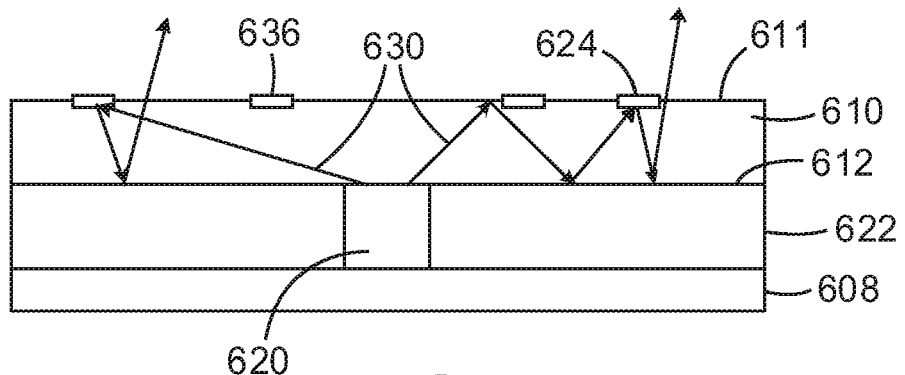
FIG. 7 schematically illustrates a cross-section through a light emitting element of a lighting unit, where another embodiment of a light extraction element includes prismatic elements on a guiding layer, according to principles of the present invention.

In the embodiment schematically illustrated in FIG. 7, the light extraction features 624 may comprise areas that include diffractive structures or diffusely reflecting material 636 provided on the upper surface 611 of the guiding layer 610. Light 630 is guided within the guiding layer 610. However, after diffraction or diffuse reflection off the diffractive structures or diffusely reflecting material 636, the light 630 is directed to the intermediate layer 622, which reflects the light back through the guiding layer 610 towards the viewer. The density of the diffractive structures or diffusely reflecting material 636 on the surface 611 of the guiding layer 610 may be selected so as to direct light to the intermediate layer 622 while also permitting light to pass through the upper surface 612 towards the viewer.

Figure 8:
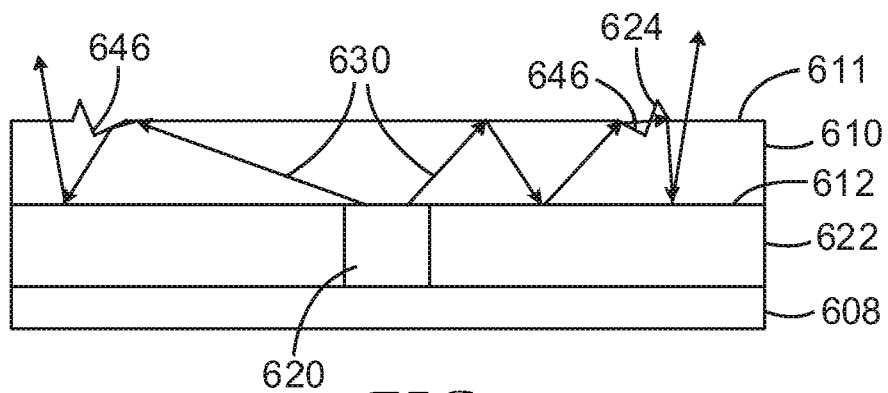
FIG. 8 schematically illustrates a cross-section through a light emitting element of a lighting unit, where another embodiment of a light extraction element includes prismatic elements on a guiding layer, according to principles of the present invention.

In the embodiment schematically illustrated in FIG. 8, the light extraction features 624 comprise extraction grooves 646 that penetrate the upper surface 611 of the guiding layer 610. The extraction grooves 646 help to direct light from the upper surface 611 to the intermediate layer 622 which reflects the light back through the guiding layer 610 to the viewer.

Figure 9:
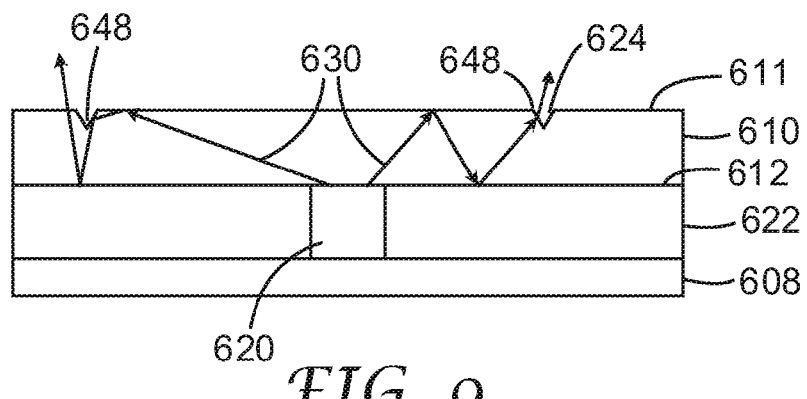
FIG. 9 schematically illustrates a cross-section through a light emitting element of a lighting unit, where another embodiment of a light extraction element includes indentations on a guiding layer, according to principles of the present invention.

In the embodiment schematically illustrated in FIG. 9, the light extraction features comprise indentations 648 that penetrate the upper surface 611 of the guiding layer. The indentations 648 may direct light from the upper surface to the intermediate layer 622 at an angle that permits the light reflected from the intermediate layer 622 to be transmitted through the upper surface 611 of the guiding layer. The indentations 648 may also permit light incident thereon to directly pass out of the guiding layer 610. The indentations 648 and grooves 646, shown in FIG. 8, may be implemented on the guiding layer 610 in any pattern for extracting the light from the guiding layer to produce a desired illumination profile.

Figure 10A:
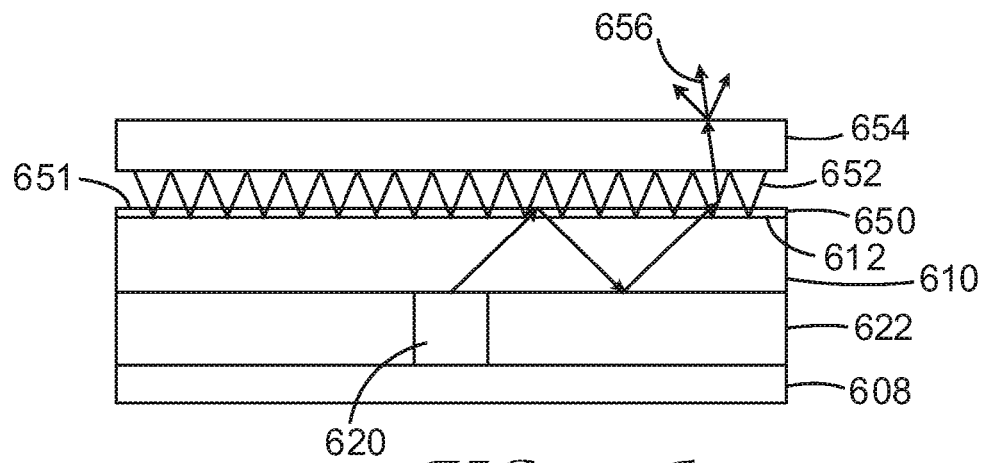
FIG. 10A schematically illustrates a cross-section through a light emitting element of a lighting unit, where another embodiment of a light extraction element includes prismatic elements on a guiding layer, according to principles of the present invention.

In the embodiment schematically shown in FIG. 10A, the light extraction feature 624 comprises a layer of optical coupling material 650 and a plurality of prism-type structures 652 whose apexes penetrate into the optical coupling material 650. The prism-type structure 652 may be attached to a base layer 654. For example, the prism-type structures 652 may be molded with the base layer 654 or may be bonded to the base layer 654. The optical coupling material 650 may be, for example, a thin layer of adhesive with a thickness in the range 1-20 µm. In this particular embodiment, the light 630 may pass out of the guiding layer 610 to be totally internally reflected at the upper surface 651 of the coupling material 650. The light 630 is directed to the intermediate layer 622 which reflects the light back upwards. Some of the light incident on the upper surface 612 of the guiding layer 612 is coupled into the prism-type structures 652, which reflect the light upwards in the general direction of the viewer. The base layer 654 may be provided with a surface or volume diffuser to diffuse the light 656 emitted from the base layer 654. The prism-type structures 652 may be shaped in a pattern centered around the LED 620, or may be provided in some other pattern. For example, the prism-type structures may be linear.

Figure 10B:
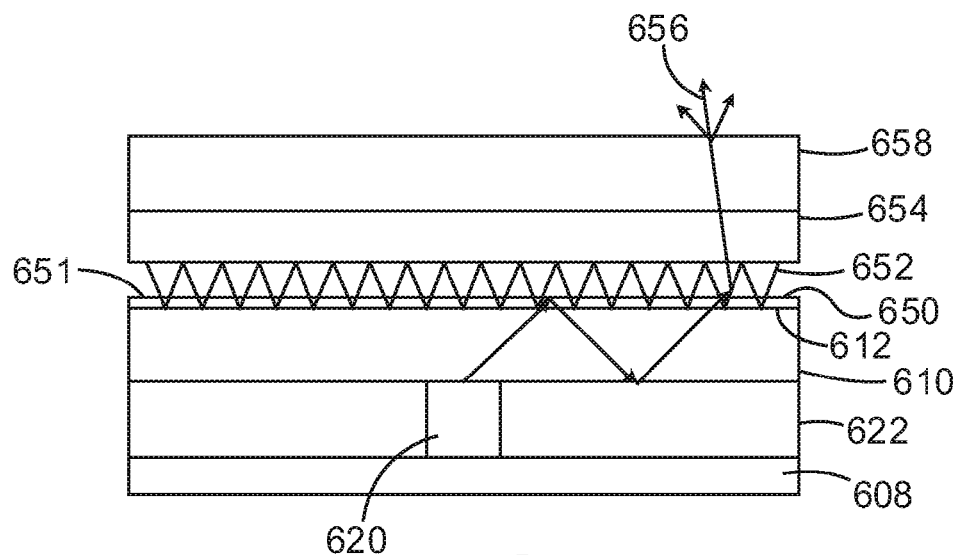
FIG. 10B schematically illustrates an embodiment of a light emitting element like that illustrated in FIG. 10A along with a screen layer, according to principles of the present invention.
Figure 11:
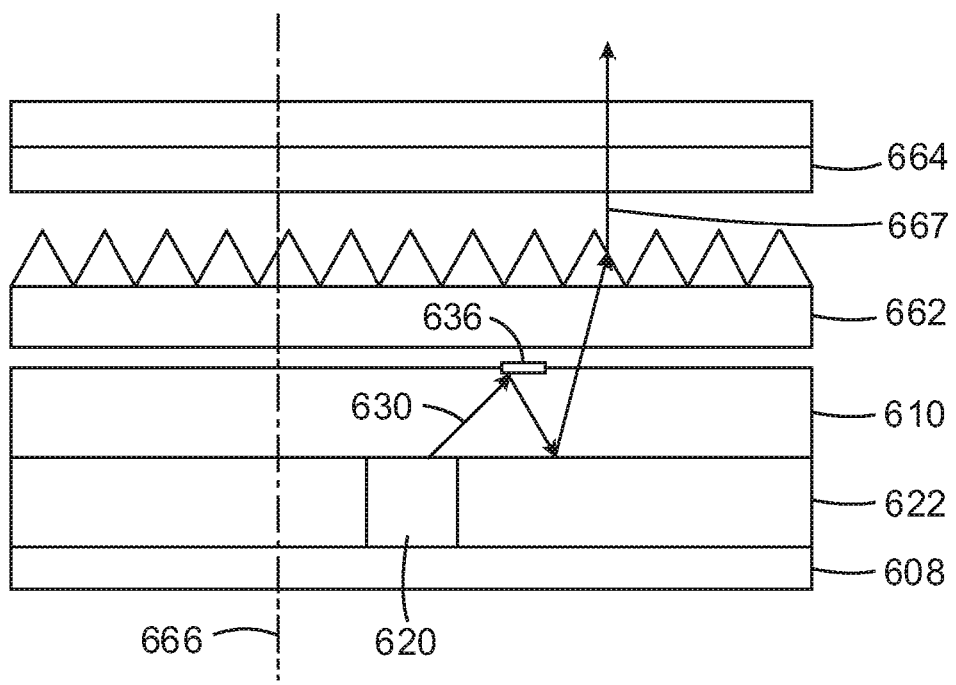
FIGS. 11 and 12 schematically illustrate embodiments of a light emitting element that incorporates light management films, according to principles of the present invention.

In a variation of the embodiment illustrated in FIG. 10A, a contrast/projection filter 658 may be provided close to the output side of the base layer, for example as is illustrated in FIG. 10B.

One or more light management films may be used above the guiding layer for directing or redirecting the light. For example, one or more brightness enhancing films, available from 3M Company, St. Paul, Minn., under the trade name BEF™, may be used to direct the light more in a direction perpendicular to the substrate 608. Brightness enhancing films typically comprise a plurality of prismatic refractive elements which, when illuminated from the base side of the prismatic elements, refract the transmitted light in a direction more parallel to the axis. In the example illustrated in FIG. 11, a light emitting element that uses a diffractive light extraction element 636 emits light from the guiding layer 610 in a first direction relative to the axis 660. The light 667 is refracted upon exiting the first brightness-enhancing layer 662 in a second direction that is closer to the axis 666 than the first direction. In some embodiments, only one layer of brightness enhancing film 662 is used. Typically, the prisms of the first brightness enhancing film are ribbed, and so a single layer of brightness enhancing film redirects the light in only one dimension. A second additional layer of brightness enhancing film 664 may optionally be used, where the ribbed prisms of the second layer of brightness enhancing film 664 are oriented perpendicular to those of the first layer 662: the combination of the two layers 662 and 664 of brightness enhancing film redirects the light towards the axis 666 in two dimensions.

Figure 12:
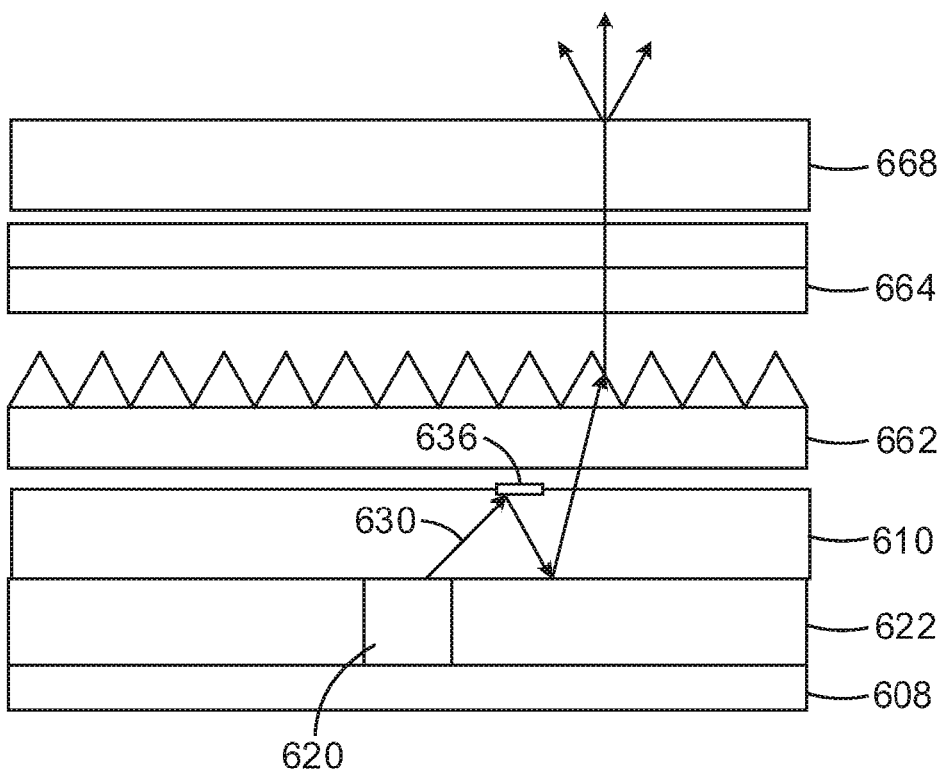

A contrast/projection filter 668 may be provided at the output from the light management films 662 and 664, for example as is schematically illustrated in FIG. 12. For certain applications, a reflective polarizing layer may be provided above the light emitting element, for example a multilayer optical film (MOF) reflective polarizer such as Vikuiti™ DBEF film supplied by 3M Company, St. Paul, Minn. A reflective polarizer transmits light in one polarization state and reflects the light in the orthogonal polarization state: such a polarizer may be used when the light emitting element is used to provide polarized light, e.g. for backlighting an LCD display. The light in the polarization state that is reflected by the reflective polarizer is reflected back towards the substrate 608. One of the layers, for example the intermediate layer 622 may be treated to reflect the light reflected by the reflective polarizer in a manner that causes some depolarization, so that the light reflected by the reflective polarizer may be recycled and eventually passed through the reflective polarizer.

Figure 13:
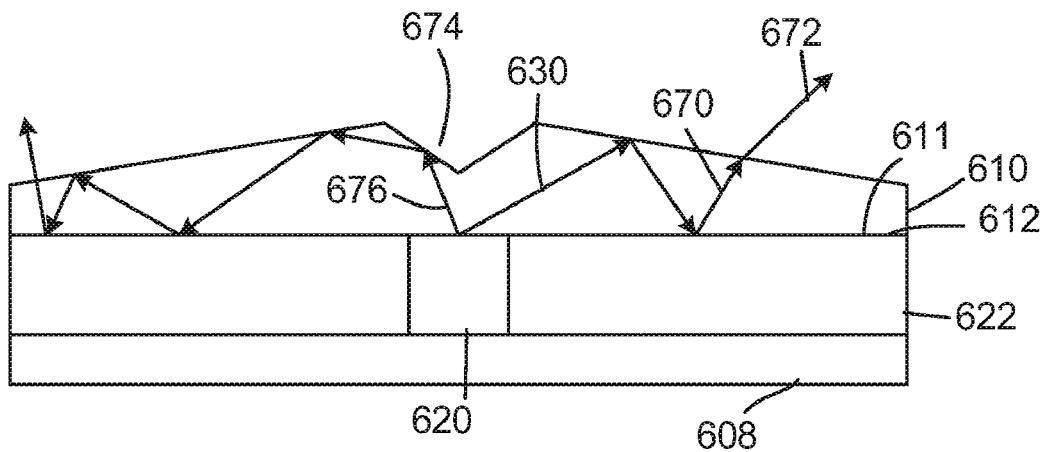
FIG. 13 schematically illustrates an embodiment of a light emitting element having a guiding layer with an upper surface that is non-parallel to the substrate, according to principles of the present invention.

The guiding layer 610 need not have parallel surfaces. In other words, the surfaces 611 and 612 may be nonparallel to each other. One such embodiment is schematically illustrated in FIG. 13, in which the light extraction feature is an upper surface 611 that lies non-parallel to the lower surface 612 and to the substrate 608. The light 630 internally reflects at the upper surface 611 and is directed to the lower surface 612, and is reflected by the lower surface or the intermediate layer 622 as light 670. However, since the upper surface 611 is not parallel with the lower surface 612, the reflected light 670 is not incident on the upper surface 611 at the same angle of incidence as the light 630 from the LED. Where the reflected light 670 is incident on the upper surface 611 at an angle of incidence less than the critical angle, the reflected light 670 is transmitted through the upper surface 611 as light 672. Another layer (not shown), such as BEF™, or the like, may be used to direct the light 672 in a direction more perpendicular to the substrate 608.

The guiding layer 610 may be provided with a component 674 for directing the light from the LED 620 along the film 610, thus increasing the amount of the light that is guided by the guiding layer 610. In the illustrated embodiment, the component 674 includes a recess positioned above the LED 620. Light 676 from the LED 620 is internally reflected at the recess surface and is directed along the film 610. Where the angle of incidence on the recess surface is sufficiently high, the light is totally internally reflected. The light 676 may be directed out of the film 610 after reflection off the oblique upper surface 611. The component 674 may also be used in other embodiments of a light emitting element discussed herein, where the guiding layer 610 has surfaces parallel to the substrate 608.

Figure 14A:
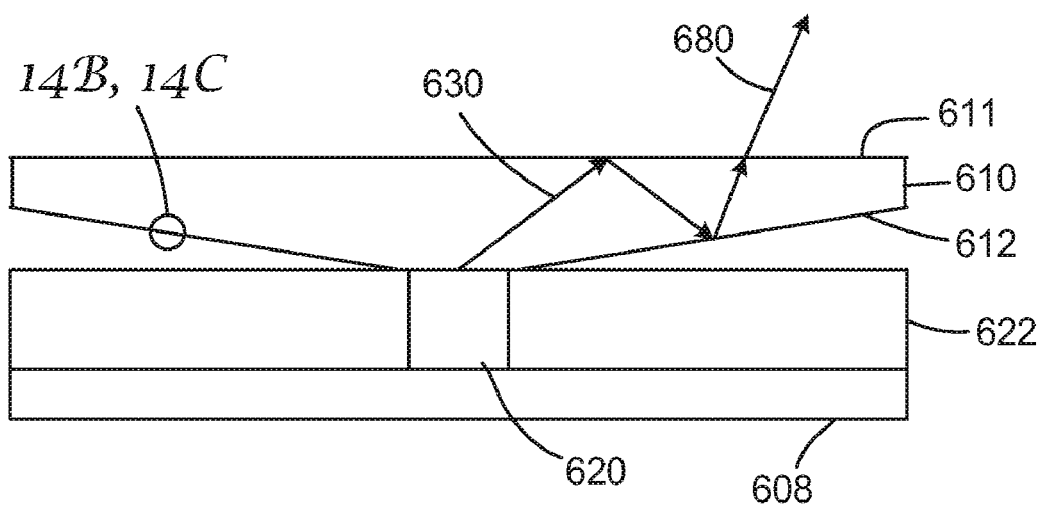
FIG. 14A schematically illustrates an embodiment of a light emitting element having a guiding layer with a lower surface that is non-parallel to the substrate, according to principles of the present invention.

Another embodiment in which the surfaces of the guiding layer are not parallel is schematically illustrated in FIG. 14A. In this embodiment, the upper surface 611 is parallel to the substrate 608, but the lower surface 612 is not parallel to the substrate 608. The light extraction feature includes, in this case, the lower surface 612. The light 630 is internally reflected by the upper surface 611 of the guiding layer 610 and directed to the lower surface 612. The light is directed back towards the upper surface 611 from the lower surface 612. When the light from the lower surface 612 is incident on the upper surface 611 at an angle of incidence that is less than the critical angle, the light 680 is transmitted through the upper surface 611.

Figure 14B:
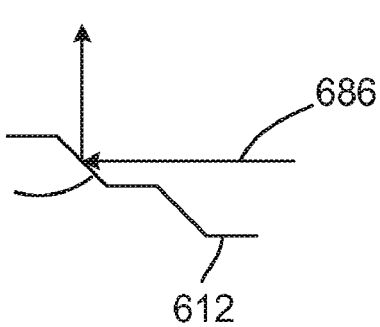
FIGS. 14B and 14C schematically illustrate structures that may be used on the lower surface of the guiding layer of the light emitting element in FIG. 14A, according to principles of the present invention.
Figure 14C:
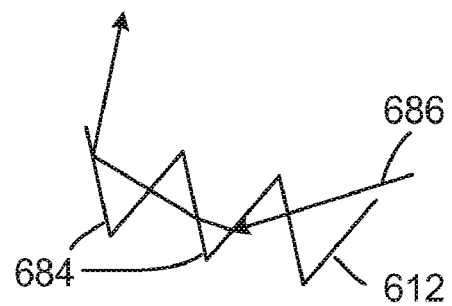

Different types of reflector may be used on the lower surface 612. For example, the lower surface 612 may be coated with a reflecting film. Other approaches include providing structure on the lower surface 612. For example, the lower surface 612 may be provided with one or more steps 682, as is schematically illustrated in FIG. 14B. The steps 682 are set at a desired angle so as to totally internally reflect some of the incident light 686. In another approach, the lower surface 612 may be provided with a series of elements 684, for example, prismatic elements that redirect the incident light 686 through a combination of refraction and total internal reflection. Light that is transmitted through the lower surface 612 of the guiding layer 610 may be reflected back through the guiding layer 610 by the intermediate layer 622.

Figure 15A:
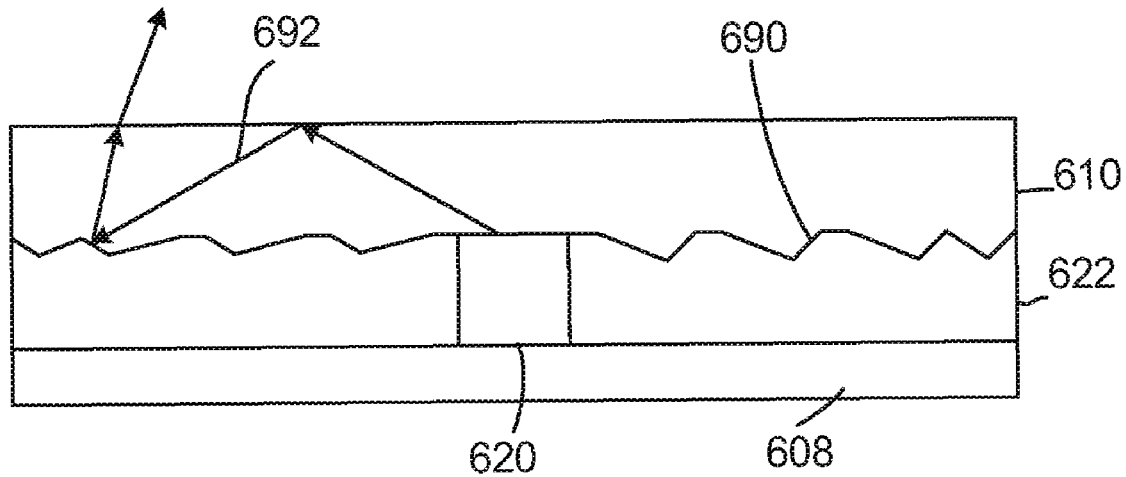
FIGS. 15A and 15B schematically illustrate cross-sections through a light emitting element of a lighting unit, where other embodiments of a light extraction element include structure on a layer below the light guiding layer, according to principles of the present invention.

The extraction feature does not have to be situated on the upper surface of the guiding layer 610, but may be provided on the lower surface of the guiding layer 610 and/or on the intermediate layer 622. One example of such an arrangement is schematically illustrated in FIG. 15A, in which a reflective intermediate layer 622 is provided with a non-planar surface structure 690. Some of the light 692 is guided by the guiding layer 610 to be incident on the surface structure 690. Some of the light reflected from the surface structure 690 is directed to the upper surface 611 of the guiding layer 610, and out towards the viewer. The surface structure 694 may be introduced to the intermediate layer 622 using a number of different techniques. Some approaches to forming a structure on a polymer reflector as may be used in the intermediate layer 622 are described in U.S. Pat. Nos. 6,045,894 and 6,096,247, the relevant portions of which are incorporated herein by reference.

Figure 15B:
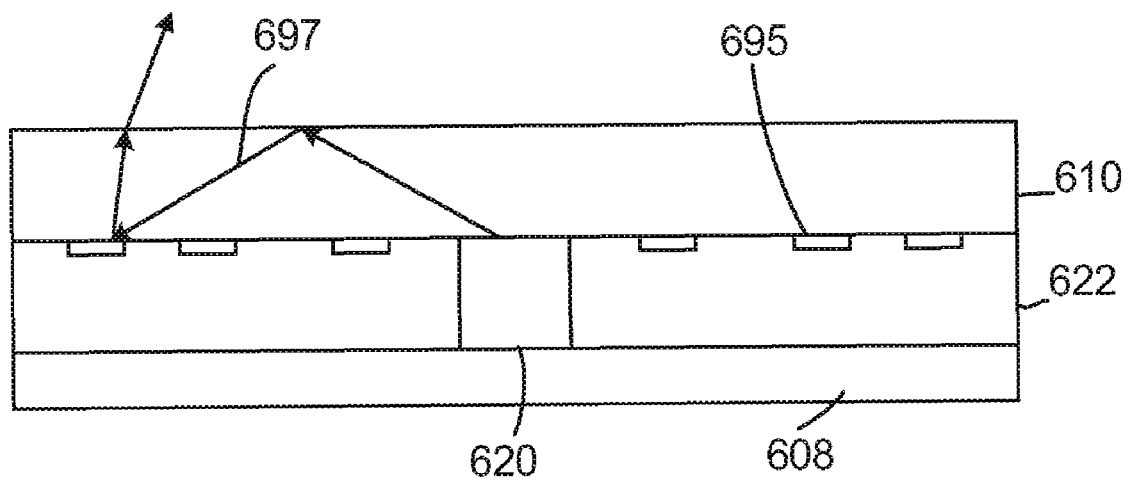

Another example is schematically illustrated in FIG. 15B, in which the upper surface of the reflective intermediate layer 622, and/or the lower surface of the guiding layer 610, is provided with patches 695 of diffusely reflective light extraction material, such as a white pigmented material. At least some of the light incident on the patches 695 is not specularly reflected, but is diffusely reflected, which allows some of the light 697 to be directed out of the guiding layer 610. Other types of light extraction features may be provided on the upper surface of the intermediate layer 622 or on the lower surface of the guiding layer 610, and may also be provide in combination with light extraction features on the top surface of the guiding layer 610.

The light extraction features described herein have been illustrated in examples that contain only one type of extraction feature. It will be appreciated that the different types of light extraction features illustrated herein may be used alone, or in combination with other types of light extraction features.

A significant fraction of the light produced by the LED 620 propagates in a direction that might pass directly through the guiding layer 610, which may lead to a viewer perceiving a central bright spot in the light emitting element. Other approaches may be used to spreading the light transversely, in addition to using a guiding layer. One such approach has been discussed above with regard to component 674, illustrated in FIG. 13, in which the light is internally reflected at recess surfaces and thus directed generally along the plane of the guiding layer 610. After lateral spreading, the light is then extracted from the guiding layer.

Figure 19A:
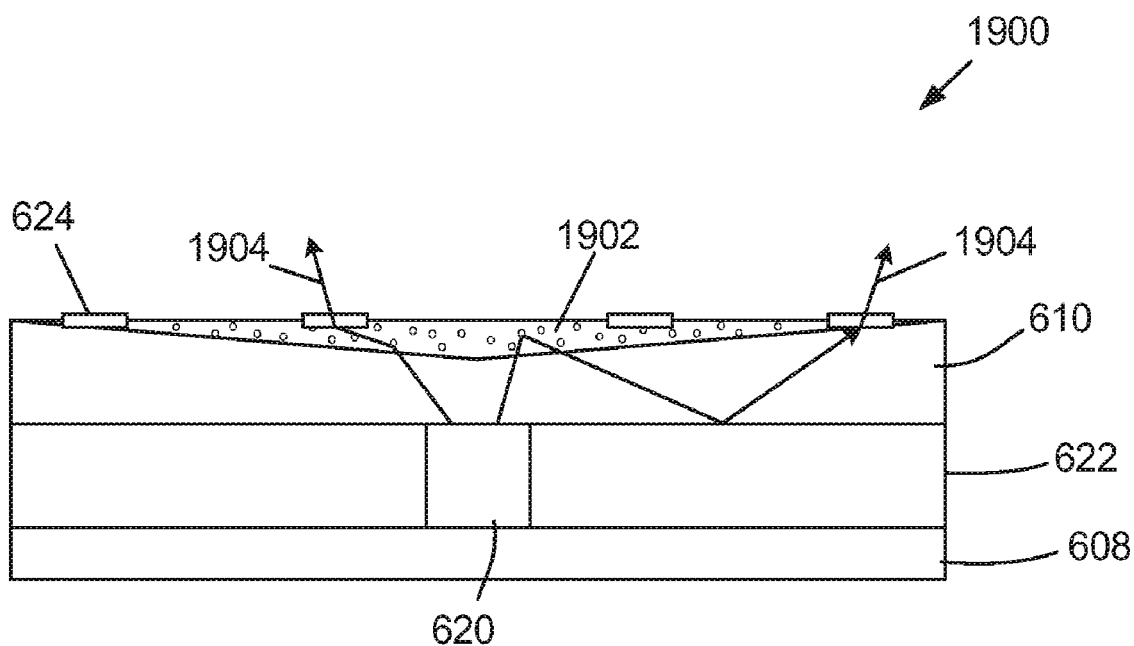
FIGS. 19A and 19B schematically illustrate cross-sections through embodiments of light emitting elements having diffuser associated with the guiding layer, according to principles of the present invention.

Another approach to spreading the light from the LED 620 within the guiding layer 610 is now discussed with reference to FIG. 19A. A diffuser 1902, such as a volume diffuser, is positioned on the far side of the guiding layer 610 from the LED 620. Where the diffuser 1902 is a volume diffuser, the volume diffuser may be located within the guiding layer 610. The diffuser 1902 is used to reduce the amount of light that passes directly through the guiding layer 610 from the LED, and thus to uniformize the output from the light emitting element. The diffuser 1902 spreads some of the light 1904 laterally so that it can be extracted from the guiding layer at some other position via an extraction feature 624.

The diffusion power of the diffuser 1902 may be spatially tailored so as to enhance the desired profile of light emitted from the light emitting element. For example, where it is desired to reduce the amount of light emitted above the LED 620, and to spread the light around the light emitting element, the diffusing power of the diffuser 1902 is greatest above the LED 620. In the illustrated embodiment, the diffuser 1902 is thickest above the LED 620 and the diffuser thickness 1902 tails off towards the edge of the light emitting element 1900. The diffusing power of the diffuser 1902 may also be adjusted by spatially varying the density of diffusing particles in the volume diffuser. In the illustrated embodiment, the thickness of the diffuser 1902 varies linearly from the center of the light emitting element 1900.

Figure 19B:
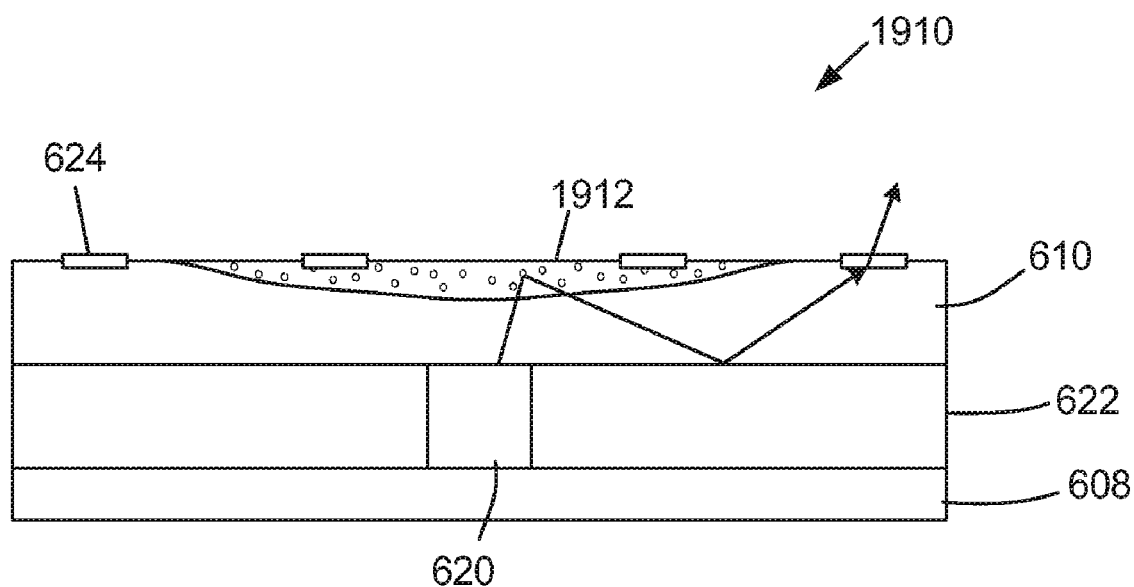

In another embodiment, schematically illustrated in FIG. 19B, the thickness of the diffuser 1912 varies nonlinearly with position across the light emitting element 1910. Furthermore, the diffuser 1912 may or may not extend over the entire area of the light emitting element 1910. In the illustrated embodiment, the diffuser 1912 is does not extend over the entire light emitting element 1910.

The light flux close to the LED tends to be high, with the result that the level of light emitted close to the LED can be significantly higher than from points further away from the LED. An example, of such an emitted intensity profile is schematically shown as curve (a) in FIG. 16A.

In order to obtain a more uniform intensity profile in the light emitted from the light emitting element, the light extraction features may be placed or adapted to extract less light at a position close to the LED itself, and to increase the amount of light extraction from the positions of the light extracting element further away from the LED. This is illustrated further with reference to FIG. 16A, which schematically illustrates a light emitting element 1600, showing the position of the LED 1620 at the center of the light emitting element 1600 and the light extraction features 1624 arranged radially around the LED 1620. In the illustrated embodiment, the density of the light extraction features increases with radial separation from the LED 1620. Appropriate selection of the light extraction density may lead to a more uniform emission intensity profile over the light emitting area, for example as illustrated as curve (b) (dashed lines). In addition, the extraction strength of the extraction features may be varied with increased distance from the LED 1620, so as to reduce the non-uniformity in light extraction over the light emitting element 1600. The extraction strength may be adjusted by varying, for example, the size of the extraction feature.

All types of extraction features may be arranged in a manner that controls the intensity profile of light emitted from the light emitting element, including upper surface and lower surface extraction features, such as prismatic structures formed on the upper surface, diffracting structures, extraction grooves, prismatic structures penetrating into the upper surface and non-parallel surfaces on the guiding film. In addition, a combination of different types of extraction features may be used, such as a surface structure on the guiding film along with non-parallel surfaces. The extraction features may be arranged to provide a relatively uniform profile illumination profile or some other desirable profile. The term "uniform" refers to a relatively flat illumination profile where the area above the LED is not significantly brighter than the surrounding area.

Figure 16A:
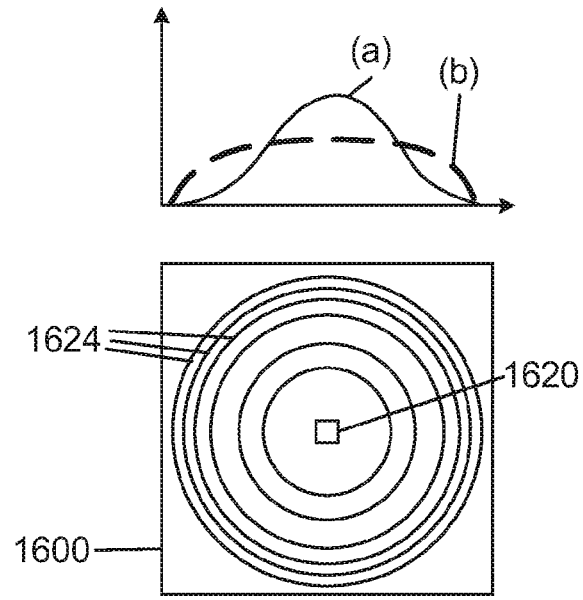
FIGS. 16A-D schematically illustrate embodiments of patterns that may be used for the light extraction elements in a light emitting element, according to principles of the present invention.
Figure 16B:
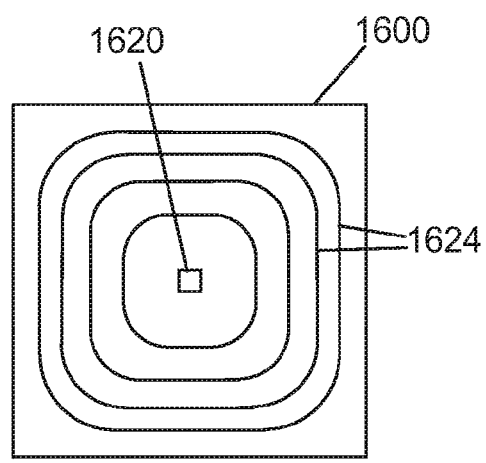

The light extraction features need not be arranged with radial symmetry around the LED, but may be arranged in some other shape. One example of such a shape is schematically illustrated in FIG. 16B, which shows the light extraction features 1624 arranged in an approximately square pattern around the LED 1620.

Figure 16C:
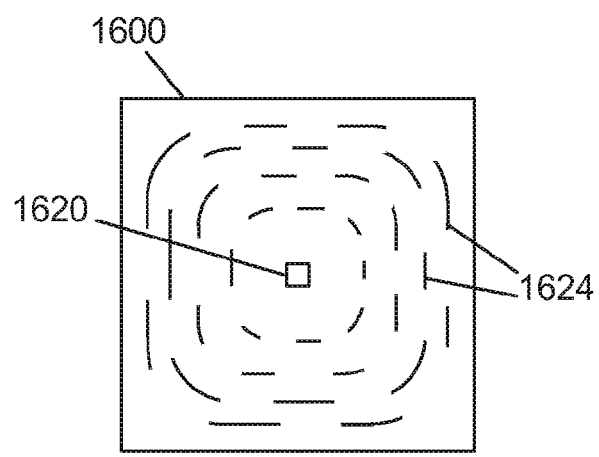
Figure 16D:
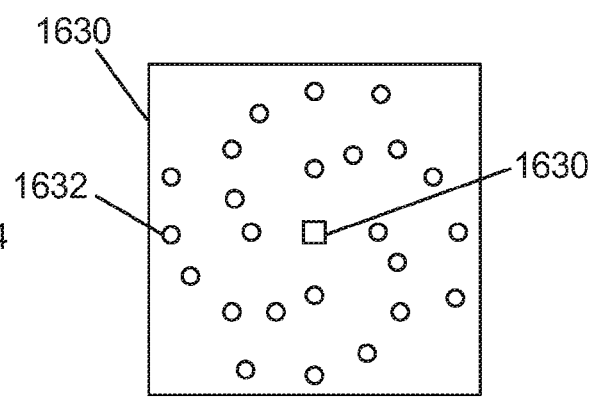

Light extraction features need not be arranged continuously around the LED, but may be discontinuous. One example of discontinuous light extraction features 1634 is schematically illustrated in FIG. 16C, in which the discontinuous light extraction features 1624, such as diffractive regions or diffusely reflective patches, are arranged in a pattern that partially maps to the pattern shown in FIG. 16B. Another example of a pattern of discontinuous light extraction features 1642 is schematically illustrated in FIG. 16D. It will be appreciated that many different types of patterns may be used, according to the desired light extraction profile.

Figure 20A:
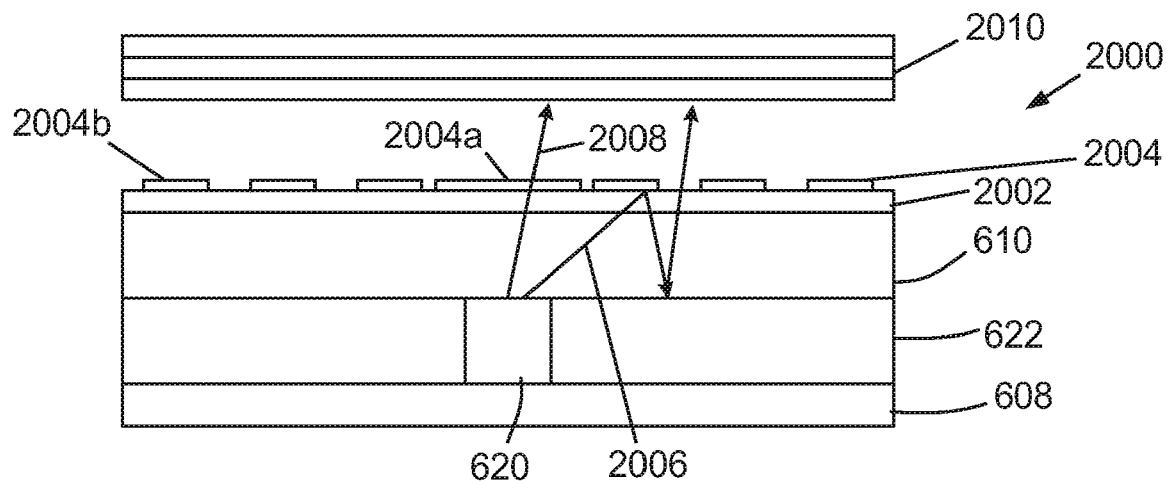
FIGS. 20A-20D schematically illustrate cross-sections through embodiments of light emitting elements having a layer of diffusely reflecting material on the viewing side of the guiding layer, according to principles of the present invention.

One embodiment of light emitting element 2000 that uses a printed pattern of light extraction elements is schematically illustrated in FIG. 20A. A sheet 2002 is provided with an arrangement of diffusely reflecting areas 2004 on at least one surface. Where the sheet 2002 is brought sufficiently close to the guiding layer 610, the light 2006 in the guiding layer 610 is coupled into the sheet 2002 and interacts with the diffusely reflecting areas 2004. Thus, the diffusely reflecting areas 2004 may be used as light extraction features. In another embodiment, the diffusely reflecting areas may be provided directly on the upper surface 611 of the guiding layer 610.

The diffusely reflecting areas 2004 may comprise, for example, a white pigment that is printed as an arrangement of dots on the sheet 2002. The diffusely reflecting areas 2004 may be patterned, for example so as to reduce the amount of light 2008 transmitted directly from the LED 620 and to increase the lateral spreading of the light 2006 for extraction from the guiding layer at an increased distance from the LED 620. The patterning may be made, for example, by varying the thickness of the diffusely reflecting material, by varying the surface density of diffusely reflecting areas provided on the surface 611, by varying the density of the material that diffusely reflects, or some combination of these different approaches. In the illustrated example, the extent (surface density) of the diffusely reflecting area 2004a above the LED 620 is greater than the extent of the diffusely reflecting area 2004b close to the edge of the light emitting element 2000, and so the amount of diffuse reflection at the upper side of the guiding layer is greater where direct illumination by the LED 620 is brighter than for other areas of the upper side of the guiding layer where direct illumination of the LED is less bright. The diffusely reflecting area may be somewhat translucent, in that some light may pass through, rather than being diffusely reflected. Light 2008 from the LED 620 is illustrated as passing through the diffusely reflecting area 2004a.

Various light management film layers 2010 may be used to affect the light once it has been directed out of the guiding layer 610. For example, the layers 2010 may include a layer of a brightness enhancement film, crossed brightness enhancement film layers, a reflective polarizer film, or a combination thereof. The layers 2010 may also include other filters and screen layers.

Figure 20B:
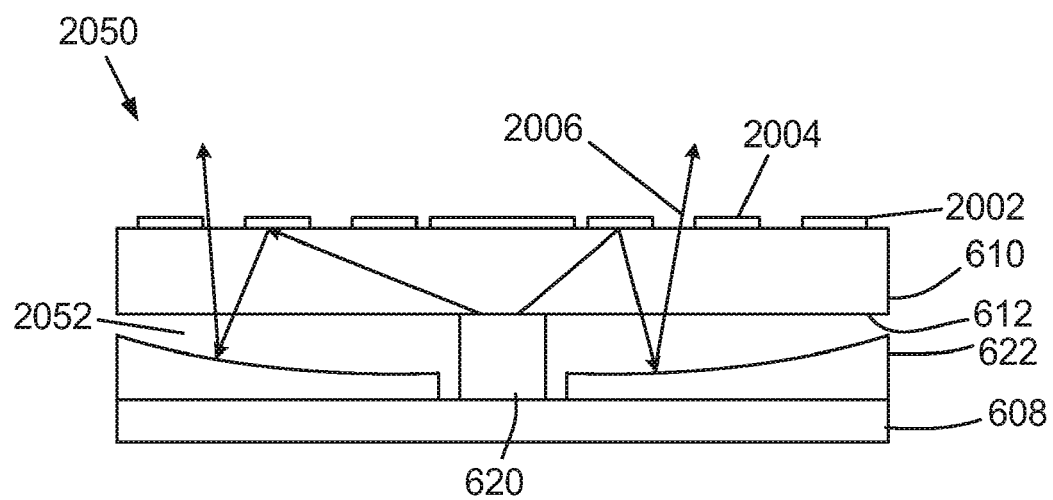

FIG. 20B shows another example of a light emitting element 2050, in which the diffusely reflecting areas 2004 are applied directly to the upper surface of the guiding layer 610. Also, the light emitting element includes a gap 2052 between the lower surface 612 of the guiding layer 610 and the intermediate layer 622. In this case, the intermediate layer 622 is reflective, so that light 2006 that is diffusely reflected through the lower surface 612 is reflected back up through the guiding layer. The reflected light 2006 may pass out of the guiding layer and through or between the diffusely reflecting areas 2004.

The intermediate layer 622 may be flat and parallel, for example as shown in FIG. 20A, or may be curved, for example as shown in FIG. 20B. A curved, reflective intermediate layer may be formed by placing ESR film over a molded form. It will be appreciate that a gap and a curved intermediate layer may be present in the different embodiments of light emitting element illustrated above and below.

Figure 20C:
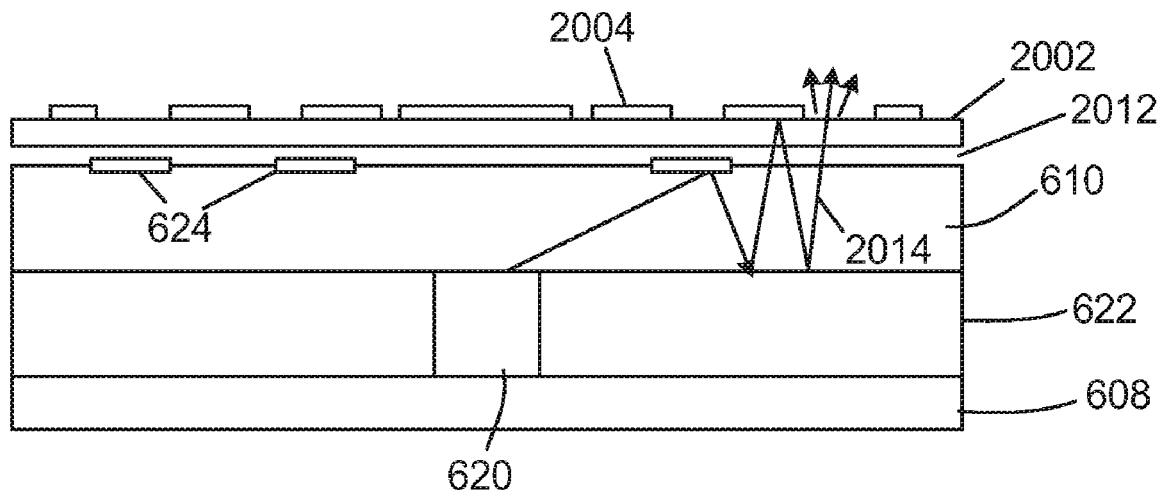
Figure 20D:
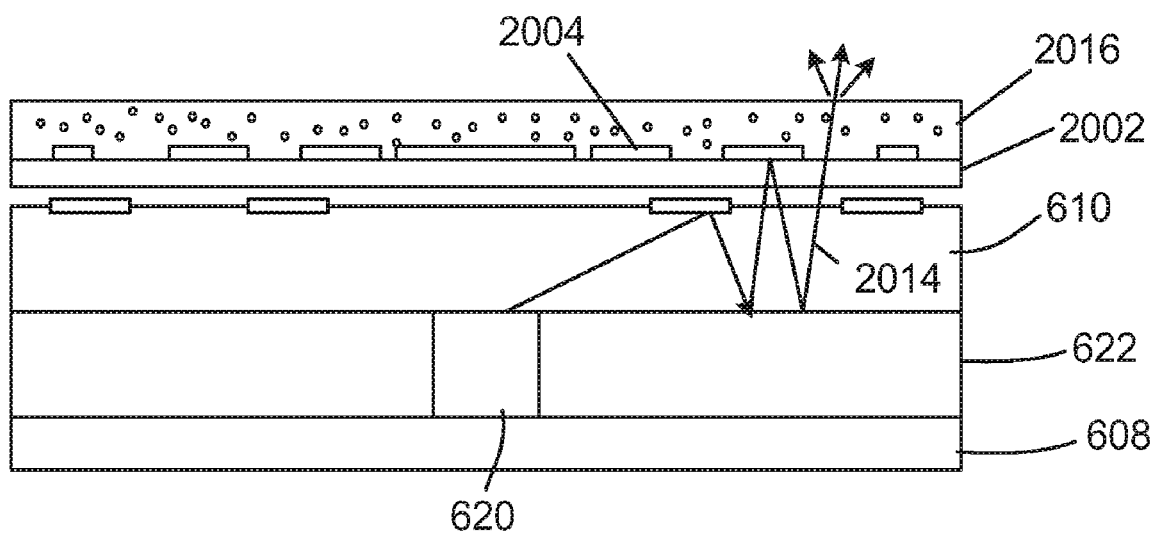

The sheet 2002 may also be used as a diffuser to help reduce the ability of a viewer to see the location of the LED 620 in the light. One example of such use is schematically illustrated in FIG. 20C. A gap 2012 separates the sheet 2002 from the guiding layer 620, and light is directed out of the guiding layer via the use of light extraction features 624. The light extraction features may be any type of light extraction features discussed above. At least some of the light 2014 incident on the diffusely reflecting areas 2004 is diffusely reflected through the guiding layer 610 to the intermediate layer 622. The light 2014 is reflected by the intermediate layer 622, through the guiding layer 610 and the sheet 2002. A diffuser 2016, such as a bulk diffuser, may also be used to further diffuse the light 2014, for example as is schematically illustrated in FIG. 20D.

The position and density of the diffusely reflecting areas 2004 may be adjusted so as to achieve a desired output illumination profile, regardless of whether the sheet 2002 is optically contacted to the guiding layer 610 or is separated from the guiding layer.

Light from one light emitting element may be permitted to pass to an adjacent light emitting element. However, in some applications such as information display, it may be desirable to prevent light from passing between adjacent light emitting elements. One approach to reduce such cross-talk between adjacent light emitting elements is to ensure that all of the light from an LED is coupled out of the guiding film before the light reaches the edge of the light emitting element.

Other approaches to reducing cross-talk between adjacent light emitting elements are now described with reference to FIGS. 17A-17D. In these figures, adjacent light emitting elements are separated by a dashed line 1702. Each light emitting element comprises at least one LED 1720 disposed on a substrate 1708, with an intermediate layer 1722 and a guiding layer 1710 over the intermediate layer. Light from the LEDs 1720 passes into the guiding layer 1710. Diffractive light extraction elements 1724 are illustrated in each case, but other types of light extraction elements may be used.

Figure 17A:
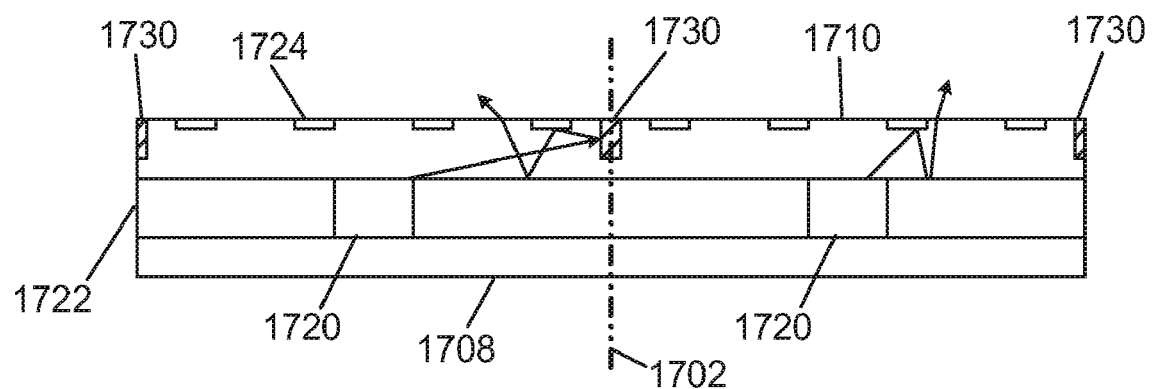
FIGS. 17A-D schematically illustrate embodiments of light emitting elements that have optical barriers between adjacent light emitting elements, according to principles of the present invention.

In the approach schematically illustrated in FIG. 17A, a reflective barrier 1730 is disposed between adjacent light emitting elements. The reflective barrier 1730 may be formed using reflective material disposed in a groove in the guiding layer 1710. The reflective material may comprise particles of a high refractive index material, such as titanium dioxide (TiO$_2$), barium sulphate (BaSO$_4$) or aluminum oxide (Al$_2$O$_3$), in a polymer matrix such as polyester (for example PEN or PET), polymethyl methacrylate, polycarbonate, polyurethane, cyclic polyolefin, or the like. The groove may be formed in the guiding layer when the guiding layer is manufactured, for example by compression molding, casting and curing, injection molding, or the like.

Figure 17B:
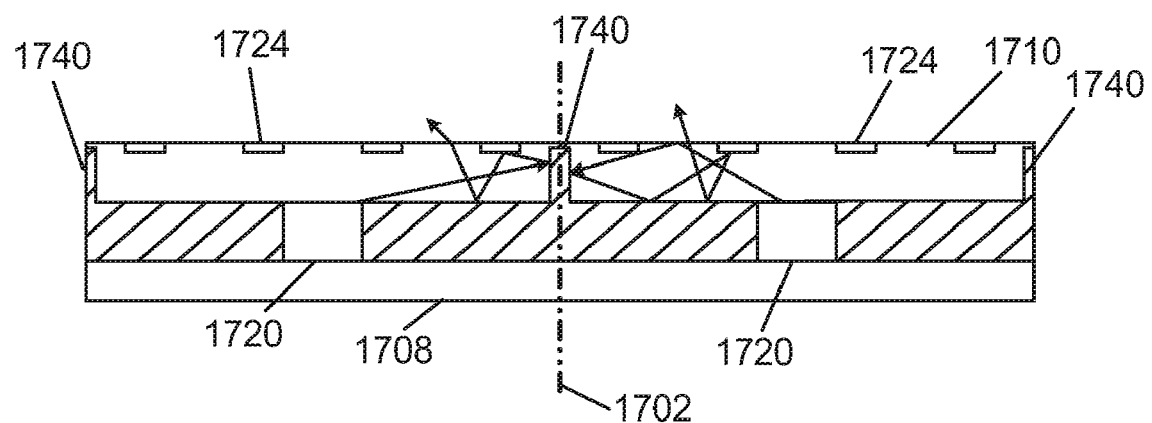

In the approach schematically illustrated in FIG. 17B, the reflective intermediate layer 1722 is provided with ribs 1740 that extend upwards. The guiding layer 1710 is formed over the intermediate layer 1722, for example by one of the molding methods listed in the previous paragraph. The ribs 1740 act as reflective barriers between the adjacent light emitting elements.

Figure 17C:
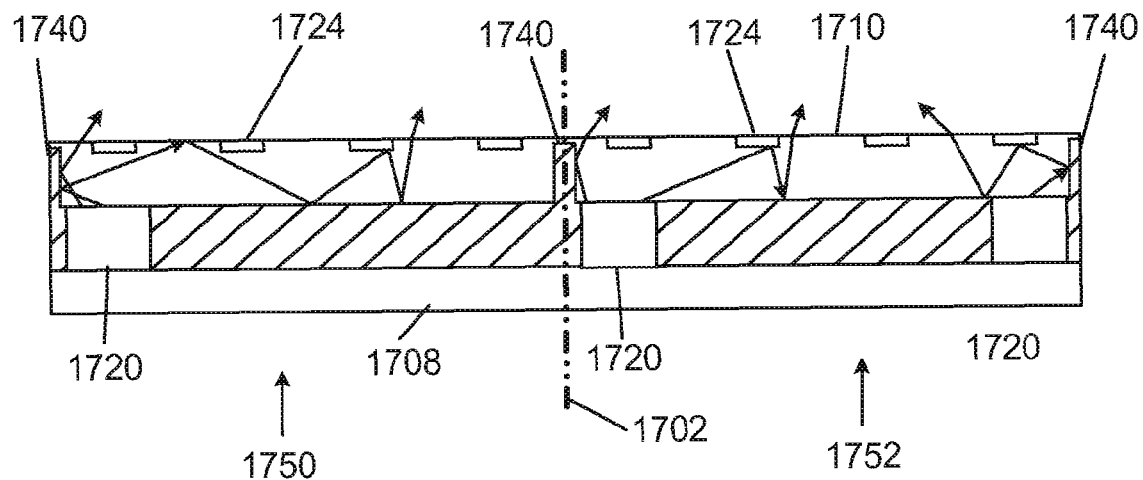

The LEDs 1720 need not be positioned at the center of the light emitting element, as is now discussed with reference to FIG. 17C. For example, the LED 1720 in the left light emitting element 1750 is positioned to the side of the light emitting element 1750, and may be placed close to the edge or corner of the light emitting element. The light extraction features 1724 are positioned and arranged to direct the light received in the light pattern that results from the off-center placement of the LED 1720.

In addition, LEDs 1720 may be placed at more than one location within the light emitting element, as is illustrated for the light emitting element 1752 on the right hand side of the figure. In the illustrated embodiment, there are two LEDs, one on either side of the light emitting element 1752. The light emitting element 1752 may include other numbers of LEDs 1720. For example, where the light emitting element 1752 has four sides, the LEDs 1720 may be positioned along the four edges of the light emitting element 1752 or at the four corners of the light emitting element 1752. The light extraction features 1724 are positioned and arranged in the light emitting element 1752 to direct the light received in the light pattern that results from the particular placement of the LEDs 1720.

Figure 17D:
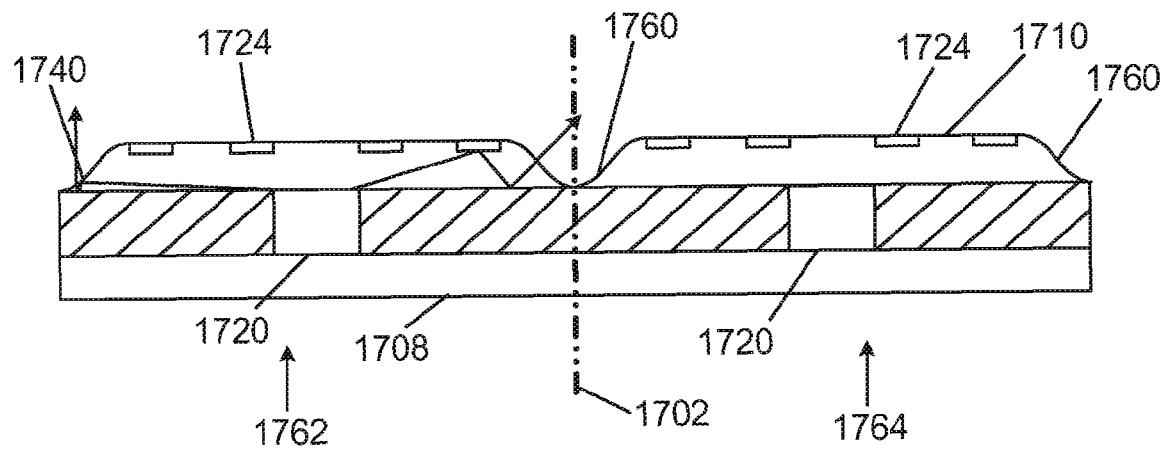

In another approach, schematically illustrated in FIG. 17D, the thickness of the guiding layer 1710 is reduced at the position 1760 between the two light emitting elements 1762 and 1764. Such a reduction in guiding layer thickness results in a reduction, if not elimination, of light that passes from one light emitting element to an adjacent light emitting element within the guiding layer 1710. The reduction in guiding layer thickness may be produced, for example, by embossing the guiding layer with a groove pattern, where the grooves lie between adjacent light emitting elements.

Figure 18A:
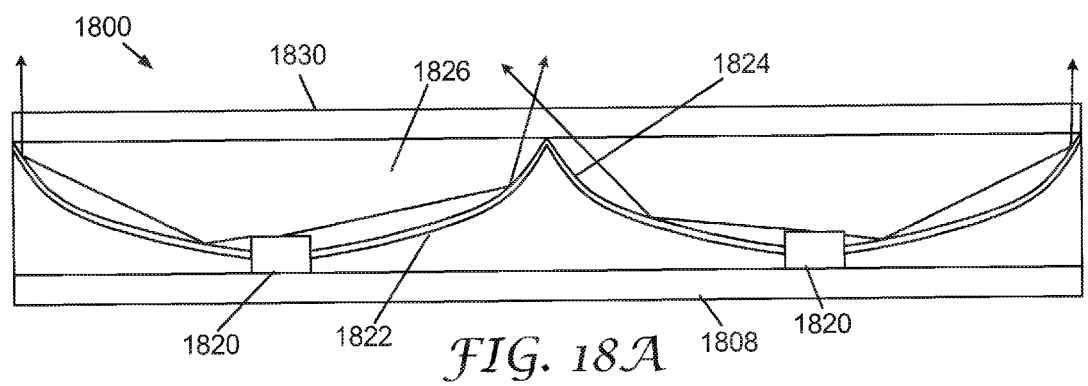
FIGS. 18A and 18B schematically illustrate cross-sections through reflective light emitting elements according to principles of the present invention.

Another embodiment of light emitting element 1800 is schematically illustrated in FIG. 18A, which shows two light emitting elements side by side. In this embodiment, LEDs 1820 are disposed on a substrate 1808. An optical sheet 1822 has apertures to accommodate the LEDs 1820, so that LEDs 1820 penetrate through the apertures. Thus the substrate 1808 is on one side of the sheet 1822 and the light emitting portions of the LED 1820 at least have a clear path to emit light through the apertures, or may be through the apertures themselves, as illustrated.

The sheet 1822 is provided with a reflecting surface 1824 that reflects the light emitted by the diodes 1820. The reflecting surface 1824 is curved so as to direct the light in a desired direction. For example, the reflecting surface may be paraboloidal, elliptical or have some other shape. The reflecting surface 1824 may be a metalized surface formed on a shaped film, or may be a multilayer reflector, for example a vacuum coated dielectric reflector or a multilayer polymer reflector. The reflecting surface 1824 may be deposited on the sheet 1822. In another approach, the sheet 1822 itself may be formed of reflecting material, for example stamped out of ESR™ film available from 3M Company, St. Paul, Minn.

The LEDs 1820 may be flip-chip type LEDs, having both electrical contacts on the lower surface attached to the substrate 1808, in which case the substrate 1808 may carry conductors for both the positive and negative contacts of the LEDs 1820.

The space 1826 above the LED 1820 and reflecting surface 1824, may be in air or may be filled with transparent material. For example, transparent material may be molded in place over the LED 1820 and reflecting surface 1824. Further, a diffuser or screen film 1830 may be disposed above the sheet 1822 to diffuse the light after being reflected by the reflecting surfaces 1824.

Figure 18B:
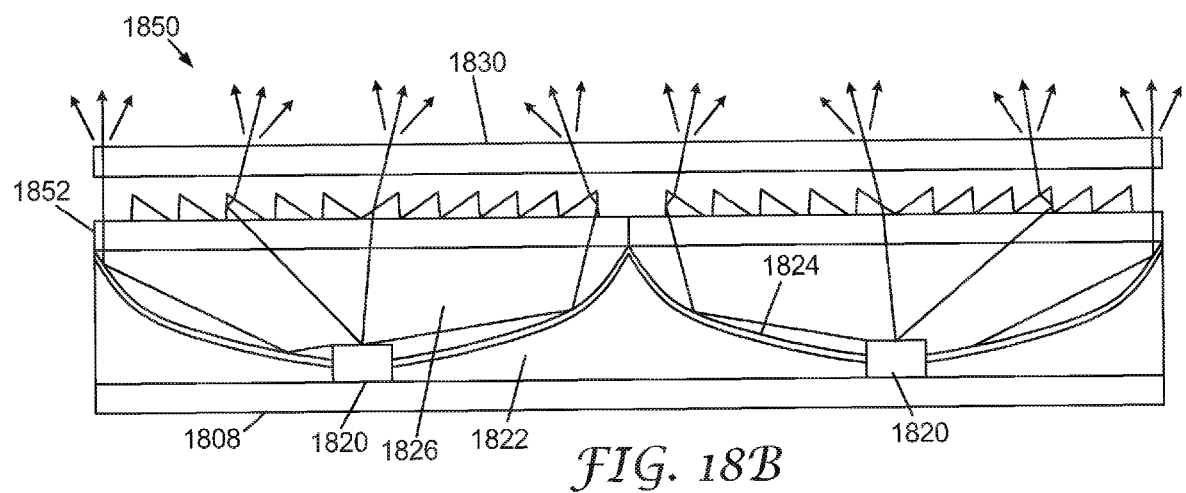

Another embodiment of light emitting element 1850 is schematically illustrated in FIG. 18B. In this embodiment, lenses are included between the reflective surfaces 1824 and the diffuser or screen layer 1830. In the illustrated embodiment, the lenses are formed on a lens sheet 1852 as prismatic lenses, for example Fresnel lenses. It will be appreciated, however, that other types of lenses may be used. For example, where the space 1826 is filled with transparent material, the lenses may be formed on the surface of the transparent material.

The different types of light emitting elements discussed herein may each be incorporated in a lighting unit used, for example, for information display or for space lighting. The constructions can be very compact since the LED dies are typically only around 300 µm thick and the guiding layer sits on top of the LED dies. Accordingly, the thickness of such a construction may be only about a millimeter or two. This leads to the possibility that the lighting unit may be flexible and may be formed in a non-planar shape. For example, the lighting unit may be wrapped around a form, such as a cylindrical form. The lighting unit may also be rigid.

While some of the embodiments of lighting unit were described above to include contrast/projection filters, it will be appreciated that all the different types of lighting unit may be provided with contrast/projection filters, if desired.

For a given lighting application, the brightness requirements, lamp pixel count and total lamp area are all considerations when determining the number of LEDs required. Examples of two different lighting applications are discussed below.

Example 1

Ceiling Lighting

This example considers a lighting fixture having a diagonal of 70" (178 cm) and an aspect ratio of 5:1. The example considers the design of a fixture that provides light equivalent to 2 fluorescent tubes at 70 L/W and using 100 W input power, or 7000 Lumens.

The assumed LED characteristics are as shown in Table I. The characteristics are similar to those for a 1 mm square Luxeon white LED available from Lumileds Lighting LLC, San Jose, Calif.

The LEDs are assumed to be driven at ⅔ maximum rated power, hence the actual current is less than the maximum current. The calculated lighting unit design is summarized in Table II.

TABLE I

| LED Characteristics | |
|---|---|
| Wavelength band | White |
| Luminous efficacy (L/W) | 25 |
| Max. forward current (mA) | 350 |
| Max. power (W) | 1.19 |
| Power consumed (W) | 0.80 |
| Actual forward current (mA) | 235 |
| Forward voltage (V) | 3.4 |
| Light out (L) | 20.0 |

TABLE II

| Lighting Unit Characteristics | |
|---|---|
| Lightguide extraction/absorption factor (%) | 80 |
| LED coupling to LG (%) | 95 |
| Net efficiency (%) | 76 |
| Vertical divergence (half max., full angle) (°) | 60° |
| Horizontal divergence (half max., full angle) (°) | 60° |
| Diagonal (cm) | 178 |
| Aspect ratio | 5:1 |
| Length (cm) | 174 |
| Width (cm) | 35 |
| Number of LEDs | 350 |
| LED density ($cm^2$ per LED) | 17.4 |
| Luminous efficiency (L/W) | 25.00 |
| Power total (W) | 280 |
| Total flux (Lumens) | 7000 |
| Divergence angle gain | 1.07 |
| Axial light (candela $m^{-2}$) | 3714 |

Thus, in this example, a sheet of light emitting elements, with each light emitting element having an area of no more than 17.4 $cm^2$, with a total area of 0.6 $m^2$, provides as much light as a pair of fluorescent tubes and associated luminaire optic that take up the same area. The screen is assumed to direct the light into a 60° cone, through the use of appropriate light management films and/or projection filters. The solid angle of the emitted light, together with the indicated absorption, results in an axial gain of 1.07 relative to a perfect Lambertian emitter.

Example 2

RGB Backlight for a Liquid Crystal Display

In this example, the lighting unit is used as the backlight for a liquid crystal display (LCD) having a diagonal of 23". Each light emitting element includes four LED dies, one red, two green and one blue. Active control of the different LED dies permits for control of the backlight color. In the example design, the backlight has a color temperature of 6500 K.

TABLE III

| LED Characteristics for Backlight | | | | |
|---|---|---|---|---|
| | | | | Total |
| Number/color triad | 1 | 2 | 1 | 4 |
| Wavelength band | Red | Green | Blue | |
| Luminous efficacy (L/W) | 40 | 23 | 5 | 18.81 |
| Max. forward current (mA) | 385 | 700 | 350 | |
| Max. power (W) | 1.14 | 2.39 | 1.2 | 4.73 |
| Actual forward current (mA) | 126 | 505 | 320 | |
| Power consumed (W) | 0.37 | 1.73 | 1.09 | 3.19 |
| Forward voltage (V) | 2.95 | 3.42 | 3.42 | |
| Light out (L) | 14.83 | 39.70 | 5.47 | 60 |
| % of luminous content | 24.7 | 66.2 | 9.1 | |
| Color temperature (K) | | | | 6500 |

The lighting unit is assumed to use a single sheet of brightness enhancing film and to produce a horizontal viewing angle of 56° (half maximum, half angle) and a vertical viewing angle of 37° (half maximum, half angle). The total flux emitted from the backlight is about 1560 lumens, and the on-axis brightness is about 5191 candelas/m². The calculated properties of the example backlight unit are listed in Table IV.

TABLE IV

RGB Backlight Characteristics

| | |
|---|---|
| Lightguide extraction/absorption factor (%) | 80 |
| LED coupling to LG (%) | 95 |
| Net efficiency (%) | 76 |
| Vertical divergence (half angle) (°) | 37° |
| Horizontal divergence (half angle) (°) | 56° |
| Diagonal (cm) | 58 |
| Aspect ratio | 1:1.78 |
| Length (cm) | 51 |
| Width (cm) | 28.6 |
| Number of RGB LED triad cells | 26 |
| No. of LED dies | 104 |
| LED density (cm² per LED triad cell) | 56.1 |
| Luminous efficiency (L/W) | 18.81 |
| Power total (W) | 82.95 |
| Total flux (Lumens) | 1560 |
| Absorption adjusted viewing area gain | 1.60 |
| Backlight axial light (candela m$^{-2}$) | 5191 |

Thus, the present invention may effectively be used as a backlight for LCD displays. Such a backlight may permit the LCD display to operate with field sequential color, that is, the sequential illumination of the LCD with light of different colors. Such an approach to illuminating the LCD eliminates the need for color filters in color LCD displays, thus increasing the overall efficiency and reducing cost. Optically compensated bend (OCB) mode LCDs are particularly useful for operating in a field sequential color illumination mode, due to their fast response times.

In addition, a backlight as described may be controlled so that different areas of the display are illuminated at different levels of intensity. This may be advantageous, for example, when displaying an image having high contrast, where one part of the image is very bright and another part of the image is very dark. The brightness of the LEDs illuminating the dark part of the image may be reduced, or they may even be turned off, with the result that the dark areas of the image appear even darker.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

We claim:

1. An optical assembly for emitting light, comprising:
an array of inorganic light emitting diodes (LEDs) mounted to a substrate, the LEDs emitting light in a direction generally perpendicular to the substrate; and
an optical sheet disposed over the LEDs, at least a portion of light entering one side of the optical sheet from the LEDs being guided within the optical sheet in a direction generally parallel to the substrate,
wherein the optical sheet comprises a first side facing towards the substrate and a second side facing away from the substrate, at least one light extraction feature being provided with the optical sheet to extract light, that has been guided along the optical sheet from the LEDs, through one of the first and second sides,
wherein the light extraction feature comprises a structure on one surface of the optical sheet.

2. The optical assembly of claim 1 wherein the light extraction feature structure comprises one or more patches of diffusely reflecting material on at least one of the first and second sides of the optical sheet.

3. The optical assembly of claim 1 wherein the light extraction feature structure comprises one or more light extraction prisms having prism bases disposed on the second side of the optical sheet.

4. The optical assembly of claim 3, wherein the light extraction prisms are arranged on the second side of the optical sheet as one or more Fresnel lenses.

5. The optical assembly of claim 3, wherein the light extraction prisms on the second side are substantially linear.

6. The optical assembly of claim 3, wherein the light extraction prisms on the second side are curved.

7. The optical assembly of claim 1 further comprising an intermediate layer disposed between the optical sheet and the substrate.

8. The optical assembly of claim 7 wherein the intermediate layer is a reflective intermediate layer.

9. An assembly as recited in claim 1, wherein the extraction feature structure comprises an array of light extraction prisms disposed with respective prism apexes directed towards the optical sheet.

10. An assembly as recited in claim 9, further comprising a coupling layer on the second side of the optical sheet, wherein the guided light passes into the coupling layer and the prism apexes extend into the coupling layer.

11. An assembly as recited in claim 9, wherein light that has coupled from the optical sheet into the light extraction prisms is totally internally reflected by the prisms in a direction away from the optical sheet.

12. An assembly as recited in claim 9, further comprising an optical diffuser, light that has passed through the light extraction prisms from the optical sheet being passed through the optical diffuser.

13. An assembly as recited in claim 9, further comprising a filter, light that has passed through the light extraction prisms from the optical sheet being passed through the filter.

14. An assembly as recited in claim 13, wherein the filter comprises a projection screen.

15. An assembly as recited in claim 13, wherein the filter comprises a polarizer.

16. An assembly as recited in claim 9, wherein the light extraction prisms are substantially linear.

17. An assembly as recited in claim 9, wherein the light extraction prisms are curved.

18. An assembly as recited in claim 17, wherein the curved light extraction prisms are curved in patterns centered on respective LEDs.

* * * * *